US012626258B2

(12) United States Patent
Sivajothi et al.

(10) Patent No.: US 12,626,258 B2
(45) Date of Patent: May 12, 2026

(54) ADVANCED SIP-BASED CALLER IDENTIFICATION AND VOICEMAIL ANALYSIS SYSTEM FOR FRAUD PREVENTION IN TELECOMMUNICATIONS

(71) Applicant: Bank of America Corporation, Charlotte, NC (US)

(72) Inventors: Sivashalini Sivajothi, TamilNadu (IN); Maneesh Kumar Sethia, Telangana (IN); Boddu Vikas Teja, Telangana (IN); Ankit Kumar Sahoo, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 18/765,860

(22) Filed: Jul. 8, 2024

(65) Prior Publication Data

US 2026/0012540 A1 Jan. 8, 2026

Related U.S. Application Data

(63) Continuation of application No. 18/763,525, filed on Jul. 3, 2024.

(51) Int. Cl.
*H04L 9/40* (2022.01)
*G06F 16/951* (2019.01)
(Continued)

(52) U.S. Cl.
CPC ........ *H04M 7/0078* (2013.01); *G06F 16/951* (2019.01); *G06F 40/279* (2020.01);
(Continued)

(58) Field of Classification Search
CPC .................................................. H04L 63/1483
See application file for complete search history.

(56) References Cited

U.S. PATENT DOCUMENTS 7,441,429 B1 10/2008 Nucci et al.
9,942,752 B1 4/2018 Marimuthu
(Continued)

FOREIGN PATENT DOCUMENTS

CA 3215224 A1 9/2022
CN 102598641 A 7/2012
(Continued)

*Primary Examiner* — Khang Do
(74) *Attorney, Agent, or Firm* — Banner & Witcoff, Ltd.

(57) ABSTRACT

Systems and processes are disclosed for a multi-layered approach to fraud prevention by leveraging a machine learning engine integrated with the Session Initiation Protocol (SIP) to attempt caller identification before transitioning to a voice call, allowing for the potential blocking of unwanted calls. If SIP-based identification remains inconclusive, an anomaly detection engine employing the Viterbi algorithm analyzes the caller's speech patterns during voicemail messages. The Viterbi algorithm converts spoken language into text, identifying suspicious characteristics such as unusual speech patterns, inconsistencies, and keywords associated with scams. If suspicious characteristics are detected, the system automatically blocks callback attempts and notifies the customer of potential spam or unwanted calls. This proactive approach addresses both live and recorded fraudulent calls, enhancing the security of telecommunications by preventing fraudulent interactions before they can cause harm. The system continuously learns from new data, adapting to evolving fraud tactics, providing robust, long-term protection for telecommunications users.

20 Claims, 9 Drawing Sheets

(51) Int. Cl.

| | |
|---|---|
| *G06F 40/279* | (2020.01) |
| *G06F 40/30* | (2020.01) |
| *G10L 17/02* | (2013.01) |
| *G10L 17/26* | (2013.01) |
| *H04L 41/16* | (2022.01) |
| *H04M 3/22* | (2006.01) |
| *H04M 7/00* | (2006.01) |

(52) U.S. Cl.

CPC .............. *G06F 40/30* (2020.01); *G10L 17/02* (2013.01); *G10L 17/26* (2013.01); *H04L 41/16* (2013.01); *H04L 63/1483* (2013.01); *H04M 3/2281* (2013.01); *H04M 2203/6027* (2013.01)

(56) References Cited

U.S. PATENT DOCUMENTS

| | | | | |
|---|---|---|---|---|
| 10,455,085 | B1 * | 10/2019 | Roundy | ................ H04W 12/12 |
| 10,645,216 | B1 | 5/2020 | Hart | |
| 10,778,839 | B1 * | 9/2020 | Newstadt | .............. H04M 1/663 |
| 10,911,596 | B1 * | 2/2021 | Do | ........................... G10L 17/00 |
| 11,102,344 | B1 * | 8/2021 | Buentello | ........... G10L 15/1822 |
| 11,343,374 | B1 * | 5/2022 | Rolia | ...................... H04M 3/36 |
| 11,595,435 | B2 * | 2/2023 | Singh | ................... G06Q 10/107 |
| 11,683,411 | B1 * | 6/2023 | Koster | .............. H04M 3/42034 |
| | | | | 379/266.07 |
| 11,924,245 | B2 * | 3/2024 | Grewal | .................... G06N 5/04 |
| 12,301,614 | B1 | 5/2025 | Payne | |
| 2002/0010587 | A1 | 1/2002 | Pertrushin | |
| 2003/0182214 | A1 | 9/2003 | Taylor | |
| 2007/0150773 | A1 * | 6/2007 | Srivastava | ......... H04L 65/1079 |
| | | | | 714/49 |
| 2007/0165821 | A1 * | 7/2007 | Altberg | .............. H04L 65/1104 |
| | | | | 379/210.02 |
| 2009/0217039 | A1 | 8/2009 | Kurapati et al. | |
| 2010/0175122 | A1 * | 7/2010 | Ballard | .............. H04L 63/1466 |
| | | | | 726/12 |
| 2013/0232560 | A1 * | 9/2013 | Luo | ........................ G06Q 20/32 |
| | | | | 726/4 |
| 2014/0376705 | A1 | 12/2014 | Layman et al. | |
| 2015/0026786 | A1 | 1/2015 | Alexander | |
| 2015/0030156 | A1 | 1/2015 | Perez | |
| 2016/0344770 | A1 * | 11/2016 | Verma | ..................... H04L 51/42 |
| 2017/0118256 | A1 * | 4/2017 | Bouvet | .............. H04L 65/1016 |
| 2017/0118335 | A1 * | 4/2017 | Brackett | ............. H04M 3/4365 |
| 2017/0295157 | A1 | 10/2017 | Chavez et al. | |
| 2017/0302793 | A1 | 10/2017 | Stock | |

| | | | | |
|---|---|---|---|---|
| 2018/0027013 | A1 * | 1/2018 | Wright | ................ H04L 61/4511 |
| | | | | 726/23 |
| 2018/0198796 | A1 * | 7/2018 | Chien | ................... H04L 63/101 |
| 2018/0205754 | A1 | 7/2018 | North | |
| 2018/0278746 | A1 | 9/2018 | Yacov et al. | |
| 2018/0376279 | A1 | 12/2018 | Hassan et al. | |
| 2019/0174000 | A1 * | 6/2019 | Bharrat | ............ H04M 3/42059 |
| 2019/0297110 | A1 | 9/2019 | Kras et al. | |
| 2020/0028690 | A1 * | 1/2020 | Barakat | ................. H04L 9/3247 |
| 2020/0195688 | A1 * | 6/2020 | Prakash | .................. G06F 21/44 |
| 2020/0320619 | A1 | 10/2020 | Motaharian et al. | |
| 2020/0366712 | A1 * | 11/2020 | Onut | ...................... G06N 3/084 |
| 2021/0203691 | A1 * | 7/2021 | Pratt | ................... H04L 63/1416 |
| 2021/0203693 | A1 * | 7/2021 | Clausen | ............. H04L 63/1425 |
| 2021/0243204 | A1 | 8/2021 | Taylor et al. | |
| 2021/0407514 | A1 | 12/2021 | Laird et al. | |
| 2022/0245639 | A1 | 8/2022 | Cousins | |
| 2022/0247866 | A1 * | 8/2022 | Xiao-Devins | ....... H04M 3/5335 |
| 2023/0088868 | A1 | 3/2023 | Haltom et al. | |
| 2023/0164198 | A1 * | 5/2023 | Bhattacharjee | ..... H04L 65/1104 |
| | | | | 370/271 |
| 2023/0229755 | A1 | 7/2023 | Maiman et al. | |
| 2023/0316285 | A1 | 10/2023 | Kramme et al. | |
| 2023/0344868 | A1 * | 10/2023 | Kaligotla | ............ H04L 63/1483 |
| 2023/0362299 | A1 | 11/2023 | Ranalli | |
| 2024/0040035 | A1 * | 2/2024 | Dropuljic | .............. G10L 15/005 |
| 2024/0422174 | A1 | 12/2024 | Grover et al. | |
| 2025/0080646 | A1 * | 3/2025 | Rodriguez Bravo | ........................ H04M 3/2281 |
| 2025/0286954 | A1 * | 9/2025 | Goyal | .............. H04M 3/53333 |
| 2025/0358364 | A1 | 11/2025 | Piscopo, Jr. | |

FOREIGN PATENT DOCUMENTS

| | | | |
|---|---|---|---|
| EP | 4156665 | A1 | 3/2023 |
| JP | 2009512082 | A | 3/2009 |
| KR | 20070082179 | A | 8/2007 |
| KR | 20100092074 | A | 8/2010 |
| KR | 101098532 | B1 | 12/2011 |
| KR | 20130052297 | A | 5/2013 |
| KR | 101295442 | B1 | 8/2013 |
| KR | 20140070880 | A | 6/2014 |
| KR | 20150092733 | A | 8/2015 |
| KR | 20160110791 | A | 9/2016 |
| KR | 101662233 | B1 | 10/2016 |
| KR | 101793958 | B1 | 11/2017 |
| TW | 201112720 | A | 4/2011 |
| WO | 2016021978 | A1 | 2/2016 |
| WO | 2017029677 | A1 | 2/2017 |
| WO | 2024026033 | A1 | 2/2024 |

* cited by examiner

Technical Process Flow Diagram

System Diagram

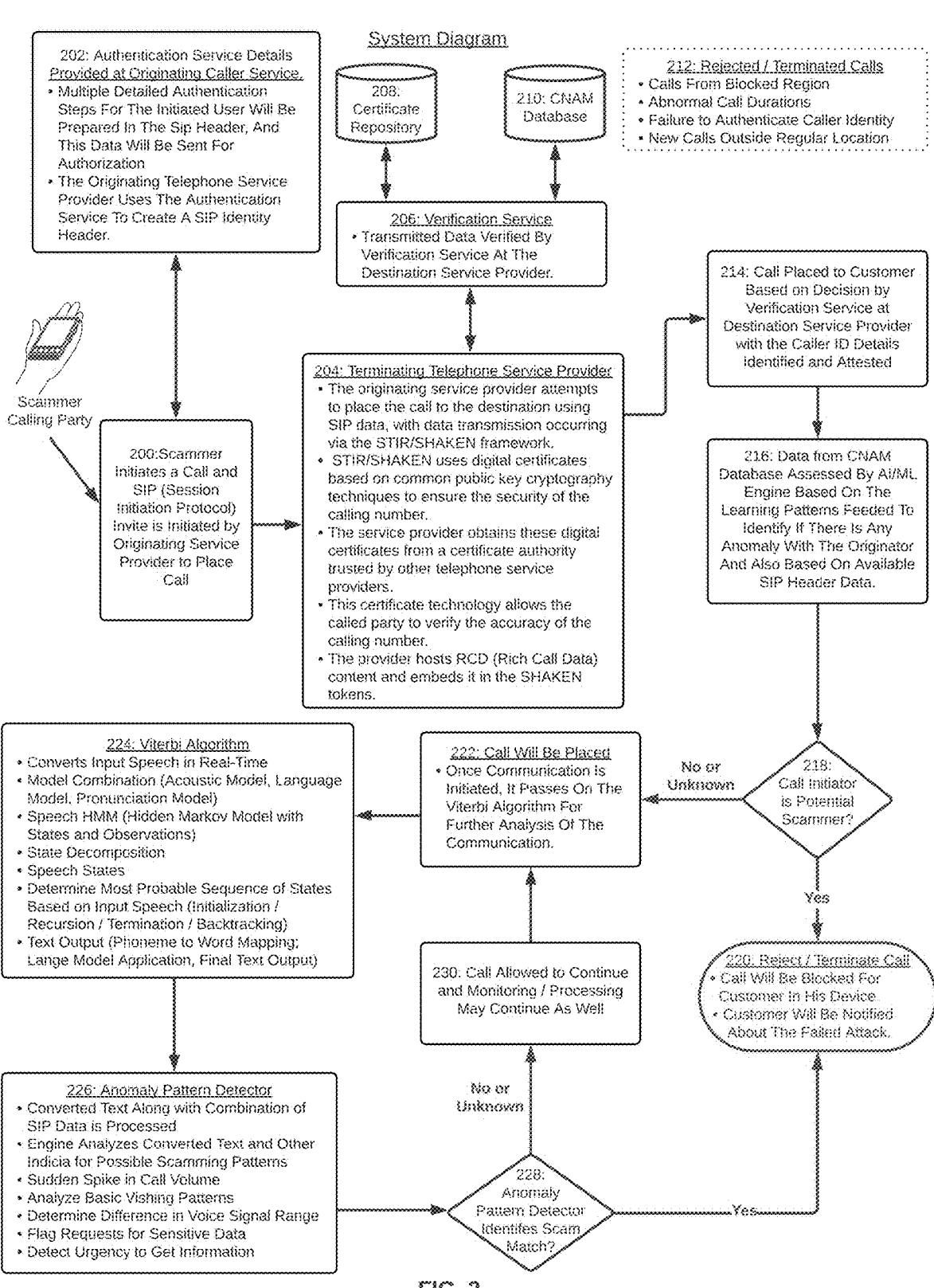

202: Authentication Service Details Provided at Originating Caller Service.
- Multiple Detailed Authentication Steps For The Initiated User Will Be Prepared In The Sip Header, And This Data Will Be Sent For Authorization
- The Originating Telephone Service Provider Uses The Authentication Service To Create A SIP Identity Header.

208: Certificate Repository

210: CNAM Database

212: Rejected / Terminated Calls
- Calls From Blocked Region
- Abnormal Call Durations
- Failure to Authenticate Caller Identity
- New Calls Outside Regular Location

206: Verification Service
- Transmitted Data Verified By Verification Service At The Destination Service Provider.

214: Call Placed to Customer Based on Decision by Verification Service at Destination Service Provider with the Caller ID Details identified and Attested

Scammer Calling Party

200: Scammer Initiates a Call and SIP (Session Initiation Protocol) Invite is Initiated by Originating Service Provider to Place Call

204: Terminating Telephone Service Provider
- The originating service provider attempts to place the call to the destination using SIP data, with data transmission occurring via the STIR/SHAKEN framework.
- STIR/SHAKEN uses digital certificates based on common public key cryptography techniques to ensure the security of the calling number.
- The service provider obtains these digital certificates from a certificate authority trusted by other telephone service providers.
- This certificate technology allows the called party to verify the accuracy of the calling number.
- The provider hosts RCD (Rich Call Data) content and embeds it in the SHAKEN tokens.

216: Data from CNAM Database Assessed By AI/ML Engine Based On The Learning Patterns Feeded To Identify If There Is Any Anomaly With The Originator And Also Based On Available SIP Header Data.

224: Viterbi Algorithm
- Converts Input Speech in Real-Time
- Model Combination (Acoustic Model, Language Model, Pronunciation Model)
- Speech HMM (Hidden Markov Model with States and Observations)
- State Decomposition
- Speech States
- Determine Most Probable Sequence of States Based on Input Speech (Initialization / Recursion / Termination / Backtracking)
- Text Output (Phoneme to Word Mapping; Lange Model Application, Final Text Output)

222: Call Will Be Placed
- Once Communication is Initiated, It Passes On The Viterbi Algorithm For Further Analysis Of The Communication.

No or Unknown

218: Call Initiator is Potential Scammer?

Yes

230. Call Allowed to Continue and Monitoring / Processing May Continue As Well

220. Reject / Terminate Call
- Call Will Be Blocked For Customer In His Device.
- Customer Will Be Notified About The Failed Attack.

226: Anomaly Pattern Detector
- Converted Text Along with Combination of SIP Data is Processed
- Engine Analyzes Converted Text and Other Indicia for Possible Scamming Patterns
- Sudden Spike in Call Volume
- Analyze Basic Vishing Patterns
- Determine Difference in Voice Signal Range
- Flag Requests for Sensitive Data
- Detect Urgency to Get Information No or Unknown

228: Anomaly Pattern Detector Identifes Scam Match?

Yes

FIG. 2

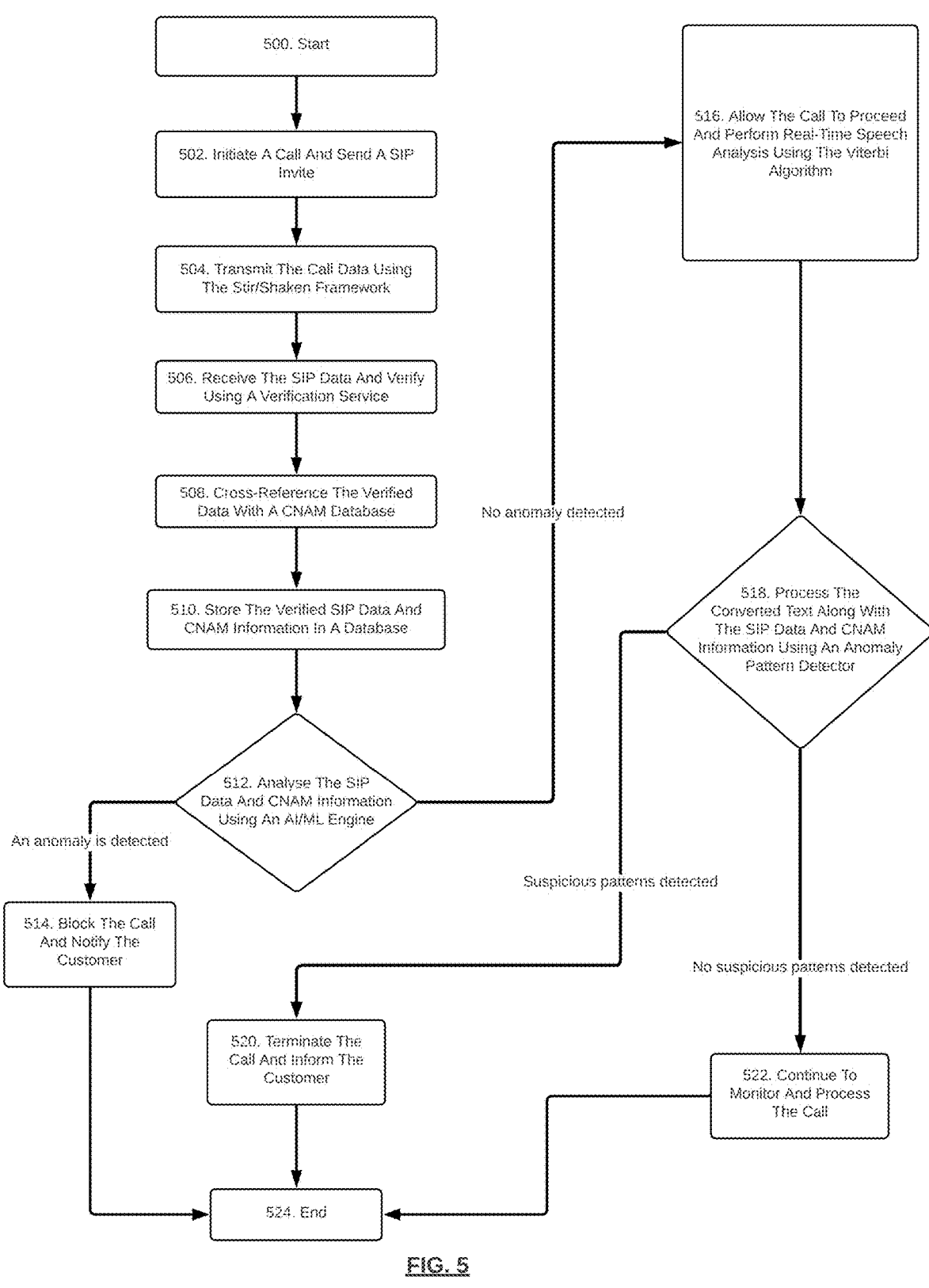

500. Start

502. Initiate A Call And Send A SIP Invite

504. Transmit The Call Data Using The Stir/Shaken Framework

506. Receive The SIP Data And Verify Using A Verification Service

508. Cross-Reference The Verified Data With A CNAM Database

510. Store The Verified SIP Data And CNAM Information In A Database

512. Analyse The SIP Data And CNAM Information Using An AI/ML Engine

An anomaly is detected

No anomaly detected

514. Block The Call And Notify The Customer

516. Allow The Call To Proceed And Perform Real-Time Speech Analysis Using The Viterbi Algorithm

518. Process The Converted Text Along With The SIP Data And CNAM Information Using An Anomaly Pattern Detector Suspicious patterns detected No suspicious patterns detected

520. Terminate The Call And Inform The Customer

522. Continue To Monitor And Process The Call

524. End

FIG. 5

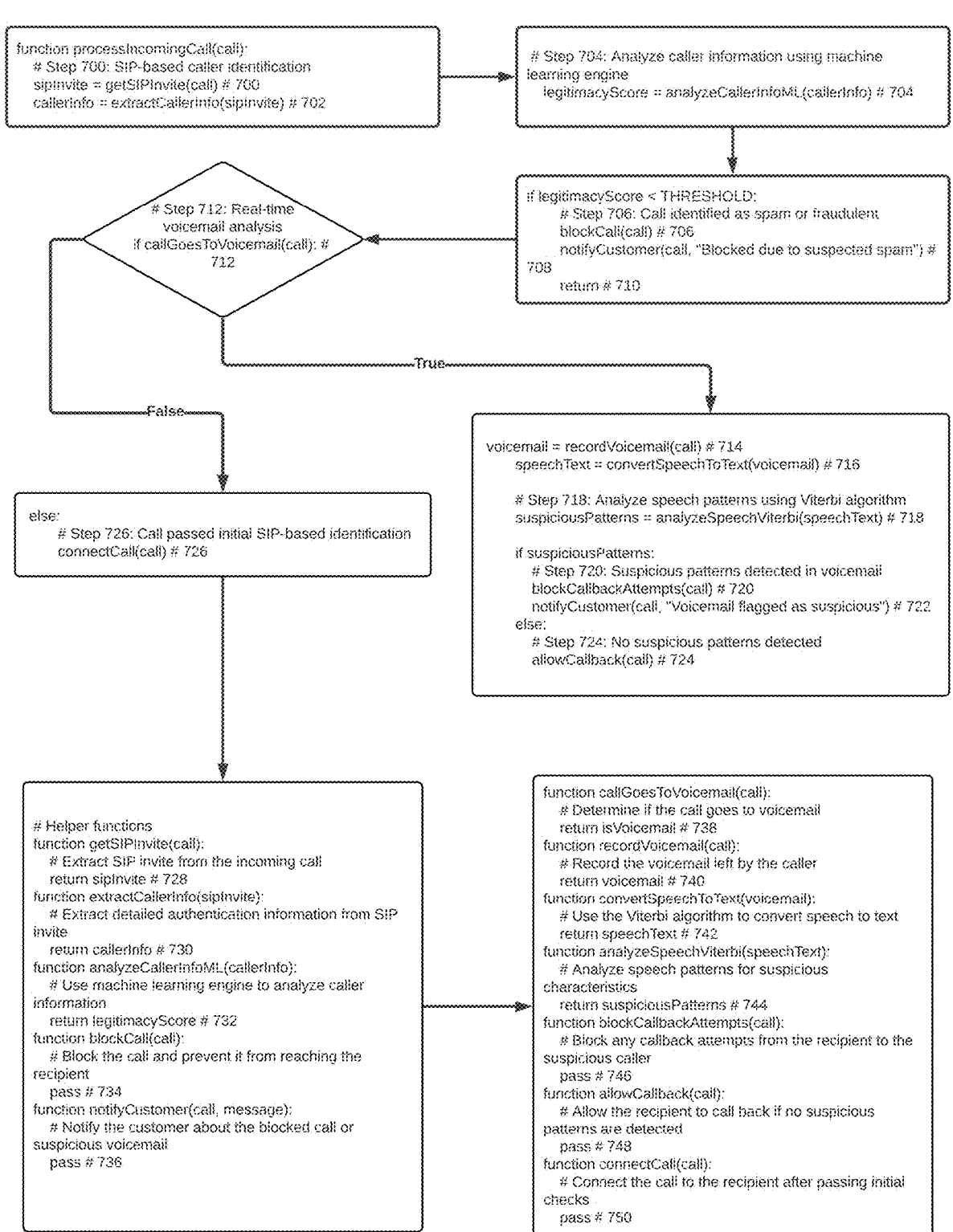

```
function processIncomingCall(call):
    # Step 700: SIP-based caller identification
    sipInvite = getSIPInvite(call) # 700
    callerInfo = extractCallerInfo(sipInvite) # 702
```

```
# Step 704: Analyze caller information using machine
learning engine
    legitimacyScore = analyzeCallerInfoML(callerInfo) # 704
```

```
# Step 712: Real-time
voicemail analysis
if callGoesToVoicemail(call): #
712
```

```
if legitimacyScore < THRESHOLD:
    # Step 706: Call identified as spam or fraudulent
    blockCall(call) # 706
    notifyCustomer(call, "Blocked due to suspected spam") #
708
    return # 710
```

```
else:
    # Step 726: Call passed initial SIP-based identification
    connectCall(call) # 726
```

```
voicemail = recordVoicemail(call) # 714
    speechText = convertSpeechToText(voicemail) # 716

# Step 718: Analyze speech patterns using Viterbi algorithm
    suspiciousPatterns = analyzeSpeechViterbi(speechText) # 718 if suspiciousPatterns:
        # Step 720: Suspicious patterns detected in voicemail
        blockCallbackAttempts(call) # 720
        notifyCustomer(call, "Voicemail flagged as suspicious") # 722
    else:
        # Step 724: No suspicious patterns detected
        allowCallback(call) # 724
```

```
# Helper functions
function getSIPInvite(call):
    # Extract SIP invite from the incoming call
    return sipInvite # 728
function extractCallerInfo(sipInvite):
    # Extract detailed authentication information from SIP
invite
    return callerInfo # 730
function analyzeCallerInfoML(callerInfo):
    # Use machine learning engine to analyze caller
information
    return legitimacyScore # 732
function blockCall(call):
    # Block the call and prevent it from reaching the
recipient
    pass # 734
function notifyCustomer(call, message):
    # Notify the customer about the blocked call or
suspicious voicemail
    pass # 736
```

```
function callGoesToVoicemail(call):
    # Determine if the call goes to voicemail
    return isVoicemail # 738
function recordVoicemail(call):
    # Record the voicemail left by the caller
    return voicemail # 740
function convertSpeechToText(voicemail):
    # Use the Viterbi algorithm to convert speech to text
    return speechText # 742
function analyzeSpeechViterbi(speechText):
    # Analyze speech patterns for suspicious
characteristics
    return suspiciousPatterns # 744
function blockCallbackAttempts(call):
    # Block any callback attempts from the recipient to the
suspicious caller
    pass # 746
function allowCallback(call):
    # Allow the recipient to call back if no suspicious
patterns are detected
    pass # 748
function connectCall(call):
    # Connect the call to the recipient after passing initial
checks
    pass # 750
```

FIG. 7

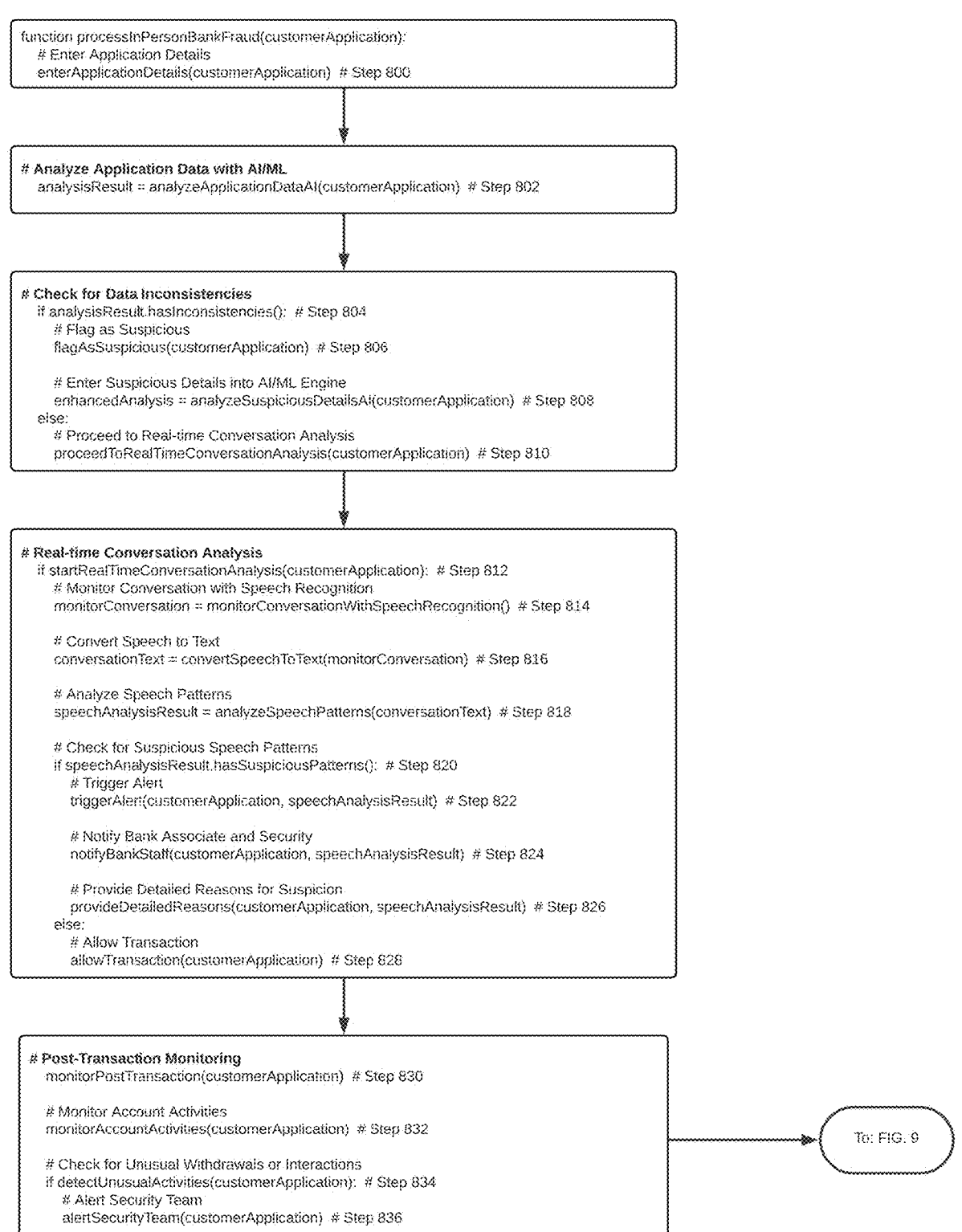

```
function processInPersonBankFraud(customerApplication):
    # Enter Application Details
    enterApplicationDetails(customerApplication)  # Step 800
```

```
# Analyze Application Data with AI/ML
    analysisResult = analyzeApplicationDataAI(customerApplication)  # Step 802
```

```
# Check for Data Inconsistencies
    if analysisResult.hasInconsistencies():  # Step 804
        # Flag as Suspicious
        flagAsSuspicious(customerApplication)  # Step 806

# Enter Suspicious Details into AI/ML Engine
        enhancedAnalysis = analyzeSuspiciousDetailsAI(customerApplication)  # Step 808
    else:
        # Proceed to Real-time Conversation Analysis
        proceedToRealTimeConversationAnalysis(customerApplication)  # Step 810
```

```
# Real-time Conversation Analysis
    if startRealTimeConversationAnalysis(customerApplication):  # Step 812
        # Monitor Conversation with Speech Recognition
        monitorConversation = monitorConversationWithSpeechRecognition()  # Step 814

# Convert Speech to Text
        conversationText = convertSpeechToText(monitorConversation)  # Step 816

# Analyze Speech Patterns
        speechAnalysisResult = analyzeSpeechPatterns(conversationText)  # Step 818

# Check for Suspicious Speech Patterns
        if speechAnalysisResult.hasSuspiciousPatterns():  # Step 820
            # Trigger Alert
            triggerAlert(customerApplication, speechAnalysisResult)  # Step 822

# Notify Bank Associate and Security
            notifyBankStaff(customerApplication, speechAnalysisResult)  # Step 824

# Provide Detailed Reasons for Suspicion
            provideDetailedReasons(customerApplication, speechAnalysisResult)  # Step 826
        else:
            # Allow Transaction
            allowTransaction(customerApplication)  # Step 828
```

```
# Post-Transaction Monitoring
    monitorPostTransaction(customerApplication)  # Step 830

# Monitor Account Activities
    monitorAccountActivities(customerApplication)  # Step 832

# Check for Unusual Withdrawals or Interactions
    if detectUnusualActivities(customerApplication):  # Step 834
        # Alert Security Team
        alertSecurityTeam(customerApplication)  # Step 836
```

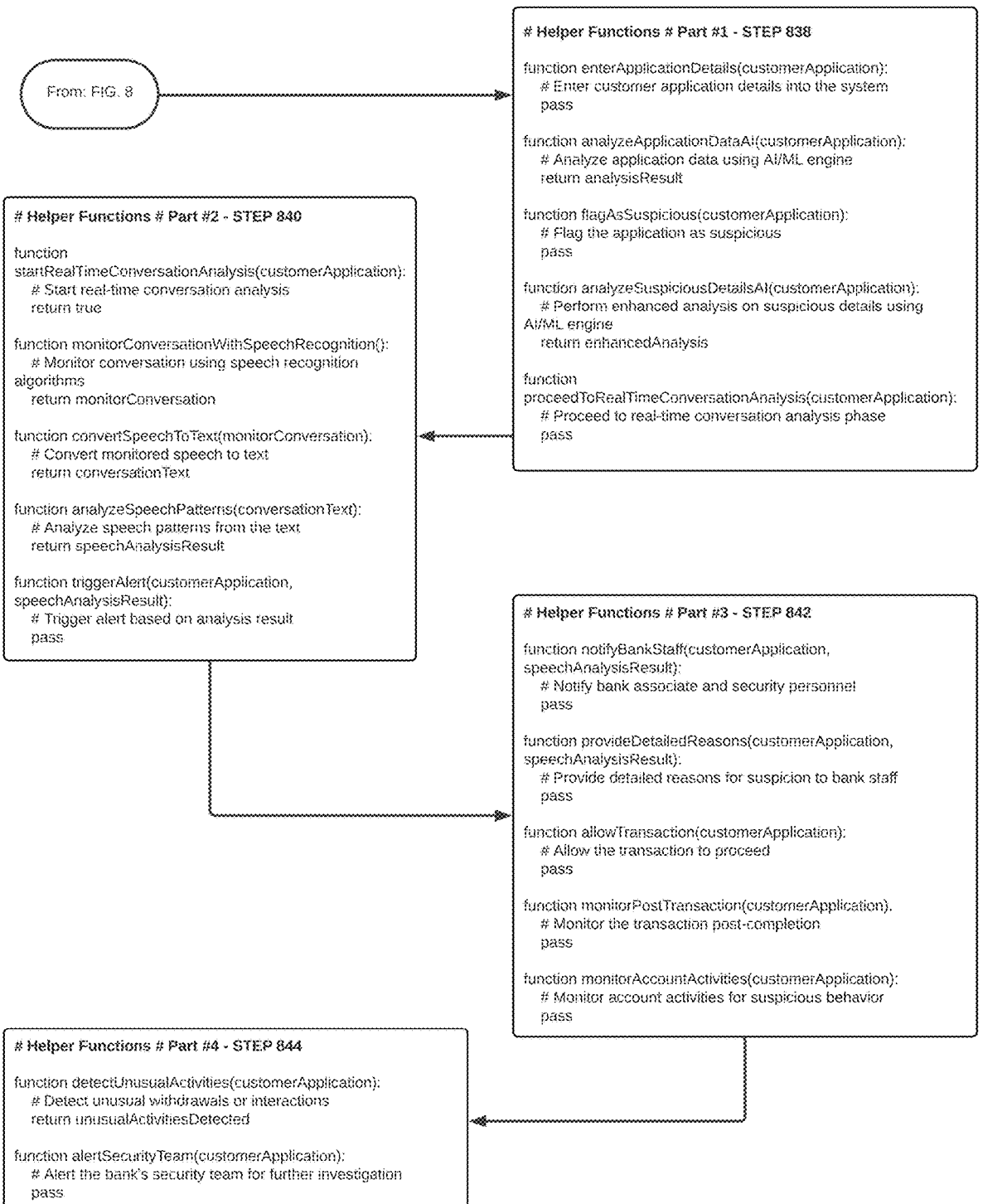

From: FIG. 8

Helper Functions # Part #1 - STEP 838

```
function enterApplicationDetails(customerApplication):
    # Enter customer application details into the system
    pass function analyzeApplicationDataAI(customerApplication):
    # Analyze application data using AI/ML engine
    return analysisResult function flagAsSuspicious(customerApplication):
    # Flag the application as suspicious
    pass function analyzeSuspiciousDetailsAI(customerApplication):
    # Perform enhanced analysis on suspicious details using
AI/ML engine
    return enhancedAnalysis function
proceedToRealTimeConversationAnalysis(customerApplication):
    # Proceed to real-time conversation analysis phase
    pass
```

Helper Functions # Part #2 - STEP 840

```
function
startRealTimeConversationAnalysis(customerApplication):
    # Start real-time conversation analysis
    return true function monitorConversationWithSpeechRecognition():
    # Monitor conversation using speech recognition
algorithms
    return monitorConversation function convertSpeechToText(monitorConversation):
    # Convert monitored speech to text
    return conversationText function analyzeSpeechPatterns(conversationText):
    # Analyze speech patterns from the text
    return speechAnalysisResult function triggerAlert(customerApplication,
speechAnalysisResult):
    # Trigger alert based on analysis result
    pass
```

Helper Functions # Part #3 - STEP 842

```
function notifyBankStaff(customerApplication,
speechAnalysisResult):
    # Notify bank associate and security personnel
    pass function provideDetailedReasons(customerApplication,
speechAnalysisResult):
    # Provide detailed reasons for suspicion to bank staff
    pass function allowTransaction(customerApplication):
    # Allow the transaction to proceed
    pass function monitorPostTransaction(customerApplication):
    # Monitor the transaction post-completion
    pass function monitorAccountActivities(customerApplication):
    # Monitor account activities for suspicious behavior
    pass
```

Helper Functions # Part #4 - STEP 844

```
function detectUnusualActivities(customerApplication):
    # Detect unusual withdrawals or interactions
    return unusualActivitiesDetected function alertSecurityTeam(customerApplication):
    # Alert the bank's security team for further investigation
    pass
```

FIG. 9

ADVANCED SIP-BASED CALLER IDENTIFICATION AND VOICEMAIL ANALYSIS SYSTEM FOR FRAUD PREVENTION IN TELECOMMUNICATIONS

CROSS-REFERENCE TO RELATED APPLICATION

This application is a continuation of U.S. application Ser. No. 18/763,525 filed on Jul. 3, 2024, which is entitled "Intelligent Technical Protocol Based Approach Leveraging AI-ML to Block Vishing Scammers" which is incorporated by reference herein in its entirety.

TECHNICAL FIELD

The technical field of the invention pertains to information security that integrates advanced artificial intelligence, machine learning algorithms, and speech recognition technologies to detect and prevent fraudulent activities. It focuses on enhancing the security of communication channels and transaction processes by utilizing real-time data analysis, voice pattern recognition, and anomaly detection. The invention operates within telecommunications frameworks such as the Session Initiation Protocol (SIP) and STIR/SHAKEN for call authentication and extends to in-person banking interactions where it analyzes application data and customer conversations to identify potential fraud. This comprehensive approach ensures robust protection against unauthorized access, identity spoofing, and fraudulent transactions.

DESCRIPTION OF THE RELATED ART

Voice phishing, or vishing, has become a significant threat in the digital era, particularly within the financial sector. Fraudsters use this method to deceive individuals into revealing sensitive information over the phone, often by posing as legitimate entities such as banks or government institutions. These scammers exploit the anonymity afforded by telecommunications technologies like Voice over Internet Protocol (VoIP) to mask their true identities and locations. The strategies employed by vishing perpetrators are increasingly sophisticated, involving techniques such as using personal information obtained from illicit sources to build trust and manipulate victims into sharing confidential details like social security numbers, bank account information, and passwords. This sophistication in tactics makes it difficult for individuals to recognize when they are being targeted by fraudsters, leading to significant financial losses and breaches of personal security.

The primary challenge in combatting vishing lies in the limitations of existing technological measures. Traditional security systems and caller identification technologies often fail to effectively detect or block these fraudulent calls. Scammers can easily bypass conventional monitoring and tracking systems by using VoIP, which allows them to make calls inexpensively from anywhere in the world. These systems enable scammers to present any chosen phone number on the recipient's caller ID, making fraudulent calls appear as though they are coming from trusted sources. This spoofing of caller ID is a critical weakness in current telecommunications security, as it undermines the reliability of caller identification systems that consumers rely on to verify the legitimacy of incoming calls.

The complexity of the telecommunications infrastructure further complicates the issue, as calls can pass through multiple networks and service providers before reaching their final destination, making it difficult to trace the origin and verify the authenticity of a call. This lack of transparency in the call's provenance is a critical gap that scammers exploit to their advantage. Additionally, the fragmented nature of telecommunications networks means that no single entity has a complete view of the call path, making coordinated efforts to detect and block fraudulent calls challenging. This fragmentation results in a piecemeal approach to security, where each service provider implements its own measures without a unified strategy, leaving gaps that fraudsters can exploit.

Moreover, the reactive nature of current anti-vishing systems means that they often only identify and block known scam numbers after fraud has been reported. This method is inherently flawed as it fails to prevent the initial wave of scams from new or previously unreported numbers, thereby allowing significant damage before any protective action can be taken. The lack of integration between different anti-fraud systems and telecommunications technologies also hampers the effectiveness of current solutions. Existing systems do not adequately share information about emerging threats or suspicious patterns, which reduces the overall effectiveness of anti-vishing measures. This lack of coordinated defense makes it easier for scammers to modify their strategies and continue targeting victims.

In-person bank fraud presents another significant challenge, particularly as fraudsters develop more sophisticated methods to deceive bank associates and circumvent traditional security measures. Fraudsters often present falsified documents or use stolen identities to open accounts, apply for loans, or conduct other fraudulent transactions. The ability of fraudsters to manipulate and coerce bank associates during in-person interactions further exacerbates the issue. Traditional verification processes relying on manual checks and the vigilance of bank employees are insufficient to consistently identify and prevent these fraudulent activities. The increasing frequency and sophistication of these fraud attempts highlight the urgent need for more robust and reliable detection mechanisms.

The integration of personal information obtained from sources such as the dark web enables fraudsters to appear more credible, making it difficult for bank associates to distinguish between legitimate and fraudulent customers. Fraudsters often use social engineering tactics, creating a sense of urgency or fear to pressure bank associates into bypassing standard verification procedures. This manipulative approach exploits the human element of the banking process, where associates may feel compelled to assist customers quickly, especially if the fraudster presents as distressed or in need of immediate help. This psychological manipulation is a powerful tool in the fraudster's arsenal, making it challenging for even well-trained associates to maintain their guard.

Furthermore, the current systems used in banks for fraud detection are often not equipped to analyze the complexities of in-person interactions. The absence of real-time analysis tools capable of evaluating both verbal and non-verbal cues leaves a significant gap in the security infrastructure. Bank associates, while trained to recognize certain red flags, cannot match the analytical capabilities of advanced AI and machine learning systems in identifying subtle indicators of fraud. This limitation results in a higher risk of fraudulent transactions slipping through the cracks, leading to financial losses for both the bank and its customers. The inability to effectively monitor and analyze in-person interactions means that many fraud attempts go undetected until it is too late.

The lack of continuous monitoring and real-time response mechanisms further limits the effectiveness of existing fraud prevention systems. Traditional methods primarily rely on post-transaction analysis to identify fraudulent activities, which is often too late to prevent financial damage. Once fraud is detected, the bank must engage in a lengthy and resource-intensive process to recover the lost funds and mitigate the impact on the affected customers. This reactive approach is not only inefficient but also fails to address the root cause of the problem, which is the initial detection and prevention of fraudulent transactions. The reliance on post-transaction analysis also means that valuable time is lost, during which the fraudster can continue their activities.

Moreover, the fragmented nature of existing fraud detection systems means that there is often a lack of communication and data sharing between different departments within a bank. This siloed approach prevents a comprehensive view of potential threats, as critical information may not be shared in a timely manner. Without a unified system that integrates data from various sources and provides real-time analysis, banks are at a disadvantage in their efforts to combat fraud. This disjointed approach also hinders the ability to quickly adapt to new fraud tactics, as insights gained from one department may not be effectively communicated to others. The lack of a cohesive strategy and integrated data sharing means that banks cannot fully leverage their resources to prevent fraud.

The fraud prevention systems currently in use also place a significant burden on the vigilance and judgment of individual bank associates. While training and awareness programs can help mitigate some risks, they are not foolproof. Human error, fatigue, and the pressures of daily operations can lead to lapses in judgment, allowing fraudulent activities to go undetected. Additionally, fraudsters are becoming increasingly adept at manipulating not only the system but also the individuals within it, exploiting their willingness to help or their fear of confrontation. This human element, while crucial, cannot be relied upon as the sole line of defense against sophisticated fraud tactics.

The long felt and unmet need for the inventions disclosed herein is to provide a more integrated, real-time, and comprehensive approach to fraud detection and prevention. Existing systems are often fragmented and reactive, failing to provide the necessary level of protection against increasingly sophisticated fraud tactics. The disclosed inventions address these issues by integrating advanced AI and machine learning technologies to analyze and authenticate caller data in real-time, significantly enhancing the security of voice communications. One aspect of the inventions extends this approach by adding a pre-call and post-call analysis mechanism that leverages SIP-based identification and voicemail analysis using the Viterbi algorithm, providing a robust defense against both live and recorded fraudulent calls. A second aspect of this invention addresses the need for real-time, in-person fraud detection in banking environments by combining data analysis with conversational monitoring, empowering bank associates to identify and prevent fraudulent transactions more effectively. Together, these inventions fulfill the long-standing need for more proactive, integrated, and adaptive fraud prevention systems that protect individuals and institutions from a wide range of fraudulent activities.

SUMMARY OF THE INVENTION

The invention presents a highly innovative and multi-faceted approach to information security, specifically targeting the detection and prevention of voice phishing (vishing) attacks through telecommunications systems. Leveraging advanced artificial intelligence (AI) and machine learning (ML) frameworks, this invention analyzes and authenticates the identity and intentions of callers in real-time. By integrating with telecommunications technologies such as the Session Initiation Protocol (SIP) and leveraging security protocols like STIR/SHAKEN for digital validation of call origins, the invention provides a robust solution to detect, prevent, and block vishing attempts. This proactive approach ensures the security of sensitive personal and financial information against fraudulent activities conducted via phone calls, thereby enhancing the overall integrity and security of telecommunication practices.

The invention begins by customizing the SIP header to include detailed authentication information about the caller. This data is then transmitted using the STIR/SHAKEN framework, which utilizes digital certificates to ensure the authenticity of the calling number, thereby preventing caller ID spoofing. Once the call data is transmitted, the verification service at the destination service provider checks the SIP Identity header, which contains a JSON web token (JWT) with encoded authentication details. This process ensures the legitimacy of the call by verifying the attestation details, origin and destination identifiers, and timestamps. The SIP data is also sent to a third-party database, typically a cloud-based application integrated with the telephone service provider, for further analysis. This database serves as a repository for the detailed authentication and verification data, enabling the AI/ML engine to access and analyze the data in real-time.

The AI/ML engine employs sophisticated machine learning algorithms to assess the SIP data for any anomalies that might indicate a potential scam. The engine considers various parameters such as calls from blocked regions, abnormal call durations, and new calls from unusual locations. If the AI/ML engine detects any anomalies suggesting that the caller might be a scammer, the call is blocked and the customer is immediately notified. This proactive measure helps prevent fraudulent interactions before they can cause harm, effectively stopping the scammer in their tracks. However, if the AI/ML engine is unable to conclusively determine the risk based on the SIP data alone, the call is allowed to proceed, undergoing further scrutiny using the Viterbi algorithm.

The Viterbi algorithm plays a key role in analyzing the real-time conversation between the caller and the recipient. This algorithm converts the spoken language into text, facilitating a detailed examination of the conversation. It combines various models, including acoustic models, language models, and pronunciation models, to accurately transcribe and analyze the speech. This real-time conversion and analysis enable the detection of any suspicious patterns in the conversation, such as inconsistencies in the speech, unusual pauses, or specific keywords commonly associated with vishing attempts. The ability to analyze speech in real-time adds a critical layer of security, ensuring that even subtle indicators of fraudulent activity are identified and acted upon swiftly.

Once the speech is converted to text, the anomaly pattern detector processes the text along with the SIP data. This detector is another layer of the AI system designed to identify patterns indicative of vishing attacks. It looks for sudden spikes in call volume, typical vishing patterns, differences in voice signal ranges, and requests for sensitive information. If the anomaly pattern detector identifies a match with known vishing patterns, the call is terminated immediately, and the customer is informed of the potential fraud attempt. This final step ensures that even if a scammer manages to bypass the initial AI/ML engine checks, they are still caught and stopped by the real-time analysis and pattern detection processes. The integration of these technologies into a cohesive system provides a comprehensive solution to the problem of vishing, significantly enhancing the security of voice communications and protecting customers from fraud.

In addition to this core functionality, the invention is expanded with new innovative approaches to further enhance security measures. The first additional aspect targets systems and methods that leverage a machine learning engine integrated with the Session Initiation Protocol (SIP) to attempt caller identification before transitioning to a voice call. This approach allows for the potential blocking of unwanted calls right at or before the initiation stage. If the SIP-based identification remains inconclusive, an anomaly detection engine employing the Viterbi algorithm analyzes the caller's speech patterns during voicemail messages. If suspicious characteristics are identified, the system automatically blocks any callback attempts and notifies the customer of the potential spam or unwanted call. This method not only enhances the initial screening process but also adds a layer of protection by analyzing voicemail content, which is often overlooked by traditional systems. By addressing both the pre-call and post-call phases, this invention ensures that every possible avenue for fraudulent activity is monitored and controlled.

In this additional embodiment, systems and methods that leverage a machine learning engine integrated with the Session Initiation Protocol (SIP) to attempt caller identification before transitioning to a voice call. This approach allows for the potential blocking of unwanted calls right at the initiation stage. In this method, when a call is initiated, the SIP invite is augmented with detailed authentication information about the caller. This information is analyzed by a machine learning engine designed to assess the legitimacy of the caller based on various parameters such as caller ID, location, and the context of the call. The machine learning engine has been trained on a vast dataset of legitimate and fraudulent calls, allowing it to identify patterns that are indicative of potential scams.

The process begins with the SIP invite being sent from the originating service provider. The invite includes the caller's identity, location, and call initiation timestamp, among other details. The machine learning engine then processes this information in real-time, comparing it against known patterns of legitimate and fraudulent calls. If the engine determines that the call is likely to be unwanted or spam, it blocks the call before it even reaches the recipient. This preemptive blocking mechanism significantly reduces the number of unwanted calls that customers receive, enhancing their overall experience and security.

In instances where the SIP-based identification remains inconclusive, the system employs a second layer of analysis using an anomaly detection engine. This engine leverages the Viterbi algorithm to analyze the caller's speech patterns during voicemail messages. The Viterbi algorithm is a powerful tool for speech recognition and analysis, capable of converting spoken language into text with high accuracy. It examines the speech for characteristics such as tone, pitch, pauses, and specific keywords that are often associated with spam or fraudulent calls.

During the voicemail analysis, the system looks for several key indicators of suspicious activity. These include unusual speech patterns, inconsistencies in the spoken information, and the use of high-pressure tactics or urgent language that is common in scam calls. For example, if the caller is pressuring the recipient to provide personal information or make an immediate decision, the system flags these characteristics as suspicious. Additionally, the system compares the caller's speech against a database of known scam scripts and phrases, further enhancing its ability to detect potential fraud.

If suspicious characteristics are identified during the voicemail analysis, the system automatically blocks any callback attempts from the recipient. This prevents the scammer from engaging the recipient in further conversation, thereby reducing the risk of successful fraud. Furthermore, the system notifies the customer of the potential spam or unwanted call, providing them with detailed information about the detected threat. This notification includes the reasons why the call was flagged as suspicious, helping the customer understand and trust the system's decision.

The integration of SIP-based identification with real-time voicemail analysis provides a comprehensive approach to call screening. By addressing both the pre-call and post-call phases, this invention ensures that every possible avenue for fraudulent activity is monitored and controlled. The use of machine learning and advanced speech analysis techniques allows the system to continuously improve its detection capabilities, adapting to new scam tactics as they emerge. This adaptive learning process ensures that the system remains effective in the face of evolving threats, providing long-term protection for customers.

Moreover, the invention can be integrated with existing telecommunications infrastructure without requiring significant changes. This makes it a cost-effective solution for service providers looking to enhance their security measures. The system's ability to operate in real-time ensures that customers are protected from scams as they happen, rather than relying on reactive measures that only address fraud after it has occurred.

Another key advantage of this invention is its scalability. The machine learning engine and anomaly detection algorithms can handle a large volume of calls simultaneously, making it suitable for both individual users and large organizations. This scalability ensures that the system can provide consistent protection regardless of the number of calls being processed.

In addition to blocking unwanted calls and notifying customers, the system can also provide valuable insights and analytics to service providers. By analyzing call patterns and identifying common characteristics of spam and fraud, the system can help providers understand and mitigate the risks associated with fraudulent calls. These insights can be used to develop new strategies and technologies for further enhancing call security.

Overall, this additional aspect of the invention offers a robust and multi-layered approach to call screening and fraud prevention. By leveraging machine learning, SIP-based identification, and real-time speech analysis, the system provides comprehensive protection against unwanted and fraudulent calls. The combination of pre-call and post-call analysis ensures that every aspect of a call is scrutinized, providing customers with a high level of security and peace of mind. The system's adaptability, scalability, and ease of integration make it a valuable addition to any telecommunications infrastructure, enhancing the overall security and reliability of voice communications.

A second additional aspect of the invention focuses on combatting in-person bank fraud, which has become increasingly sophisticated and challenging to detect. Even if a customer's application details raise suspicion, they are entered into an AI/ML engine that analyzes the data for inconsistencies, falsified information, or unusual requests that might indicate potential fraud. Simultaneously, a real-time conversation analysis engine equipped with speech recognition algorithms runs on the associate's device. This engine listens to the conversation between the associate and the customer, identifying suspicious speech patterns, hesitations, or keywords often associated with scams. By combining the analysis from both the application data and the conversation, the system creates a more comprehensive risk assessment. If a high probability of fraud is detected, an alert is triggered, notifying the associate, security personnel, and other relevant individuals. This solution empowers associates to identify and prevent fraudulent transactions in real-time, mitigating the risk of manipulation and minimizing financial losses for the bank.

In this embodiment, the invention combines advanced data analysis with real-time conversational monitoring to create a comprehensive and proactive fraud detection system. The system is designed to be deployed in bank branches, where it can assist associates in identifying and preventing fraudulent transactions in real-time.

The process begins when a customer's application details are entered into the system. These details could include information such as personal identification, account numbers, transaction requests, and other relevant data. Even if these details raise suspicion due to inconsistencies or unusual requests, they are automatically fed into an AI/ML engine. This engine is specifically trained to analyze banking data for signs of fraud. It examines the data for discrepancies, comparing it against a vast database of legitimate and fraudulent transactions. The engine looks for patterns such as mismatched information, unusually large transactions, or requests that deviate from the customer's typical banking behavior.

Simultaneously, the system employs a real-time conversation analysis engine equipped with speech recognition algorithms. This engine runs on the associate's device, monitoring the conversation between the bank associate and the customer. The speech recognition algorithms convert the spoken dialogue into text, allowing the system to analyze the conversation for signs of deceit. The engine is trained to detect suspicious speech patterns, such as hesitations, inconsistencies in the story, or the use of high-pressure tactics. It also identifies keywords and phrases commonly associated with fraudulent activities, such as urgent requests for immediate action or reluctance to provide certain information.

By combining the analysis from both the application data and the conversation, the system creates a more comprehensive risk assessment. This dual approach ensures that both the verbal and non-verbal cues are considered, providing a holistic view of the potential fraud. If the AI/ML engine and the conversation analysis engine together indicate a high probability of fraud, the system triggers an alert. This alert is sent to the bank associate, security personnel, and other relevant individuals within the bank. The alert includes detailed information about the reasons for suspicion, helping the staff make informed decisions about how to proceed.

This real-time alert system empowers bank associates to take immediate action to prevent fraudulent transactions. They can verify additional details with the customer, consult with security personnel, or even deny the transaction if necessary. This proactive approach helps mitigate the risk of fraud, protecting both the bank and the customer from potential financial losses.

Moreover, the system can be continuously updated with new data and threat patterns, ensuring that it remains effective against emerging fraud techniques. The AI/ML engine is designed to learn from each interaction, improving its accuracy and detection capabilities over time. This continuous learning process allows the system to adapt to new fraud tactics, providing long-term security for the bank and its customers.

The invention also includes features for post-transaction analysis. If a transaction is flagged but allowed to proceed, the system can monitor subsequent activities on the account for signs of fraud. This includes tracking the movement of funds, monitoring for unusual withdrawals, and analyzing further interactions with the bank. If any additional suspicious activities are detected, the system can alert the bank's security team for further investigation.

In addition to fraud detection, the system can also assist in identifying customers who may be vulnerable to manipulation or coercion. By analyzing speech patterns and behavior, the system can flag situations where a customer appears to be under duress or is being influenced by a third party. This capability is particularly valuable in cases where vulnerable individuals, such as the elderly, are targeted by fraudsters.

The invention's integration into the bank's existing infrastructure is designed to be seamless. It requires minimal changes to the bank's operational processes, making it a cost-effective solution for enhancing security. The system can be deployed on standard hardware used by bank associates, leveraging cloud-based services for data analysis and storage. This approach ensures that the system can be quickly and easily implemented across multiple branches.

Another key advantage of this invention is its scalability. The system can handle a high volume of transactions and interactions simultaneously, making it suitable for both small branches and large financial institutions. This scalability ensures that all customers, regardless of the branch they visit, receive the same level of protection against fraud.

Furthermore, the invention provides valuable insights and analytics to the bank's management team. By analyzing data on fraudulent transactions and suspicious activities, the system can identify trends and patterns that may indicate systemic vulnerabilities. These insights can be used to develop targeted training programs for staff, improve internal controls, and enhance overall security measures.

Overall, the second additional aspect of the invention offers a comprehensive and sophisticated solution to the problem of in-person bank fraud. By combining advanced data analysis with real-time conversational monitoring, the system provides a multi-layered approach to fraud detection and prevention. The integration of AI/ML engines and speech recognition algorithms ensures that both the application data and the customer's behavior are thoroughly analyzed, providing a robust defense against fraud. The system's adaptability, scalability, and ease of integration make it a valuable tool for enhancing the security and reliability of banking operations.

The integration of these new inventions with the existing system provides a multi-faceted approach to security, addressing both remote and in-person fraud scenarios. The comprehensive use of SIP, STIR/SHAKEN, AI/ML analysis, real-time speech analysis, and anomaly detection ensures a robust defense against a wide range of fraudulent activities. By continuously learning from new data and evolving threat patterns, the system remains adaptive and effective in the face of emerging scams. The proactive notification and alert mechanisms further enhance the system's ability to prevent fraud before it can cause significant harm.

Thus, the foregoing inventions provide a powerful and versatile solution to the challenges of modern telecommunications security. It not only addresses the specific threat of vishing but also extends its capabilities to other forms of fraud, ensuring comprehensive protection for individuals and organizations alike. The detailed integration of advanced technologies ensures that every aspect of a call or transaction is thoroughly analyzed and verified, providing peace of mind and security in an increasingly digital world. The system's ability to adapt to new threats and continuously improve its detection capabilities makes it a critical tool in the fight against fraud.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In some arrangements, an information-security method for detecting and preventing vishing attacks comprises the steps of initiating a call and sending a Session Initiation Protocol (SIP) invite from an originating service provider, wherein the SIP invite includes detailed authentication information in the SIP header. The method includes transmitting the call data using the STIR/SHAKEN framework, which employs digital certificates to verify the authenticity of the calling number. The SIP data is received at a destination service provider and the transmitted data is verified using a verification service, which decodes the SIP Identity header containing a JSON web token (JWT) with attestation details. The verified SIP data is stored in a third-party database for further analysis. The SIP data is analyzed using an artificial intelligence and machine learning (AI/ML) engine to detect anomalies, such as calls from blocked regions, abnormal call durations, and new calls from unusual locations. If the AI/ML engine detects potential fraud, the call is blocked and the customer is notified. If the AI/ML engine is indecisive, the call is allowed to proceed and real-time speech analysis is performed using the Viterbi algorithm, which converts the spoken language into text. The converted text along with the SIP data is processed using an anomaly pattern detector to identify vishing patterns, such as sudden spikes in call volume, typical vishing patterns, differences in voice signal ranges, and requests for sensitive information. If the anomaly pattern detector identifies a match with known vishing patterns, the call is terminated, and the customer is informed. The method also includes continuing to monitor and process the call if no suspicious patterns are detected, ensuring ongoing security.

In some arrangements, an information-security method for detecting and preventing vishing attacks comprises the steps of initiating a call and sending a Session Initiation Protocol (SIP) invite from an originating service provider, wherein the SIP invite includes detailed authentication information in the SIP header, such as caller identity, caller location, and call initiation timestamp. The method includes transmitting the call data using the STIR/SHAKEN framework, which employs digital certificates to verify the authenticity of the calling number, ensuring that the caller ID has not been spoofed. The SIP data is received at a destination service provider and the transmitted data is verified using a verification service, which decodes the SIP Identity header containing a JSON web token (JWT) with attestation details, origin and destination identifiers, and timestamps, to confirm the validity of the calling number.

The verified data is cross-referenced with a Caller Name (CNAM) database to retrieve additional caller identification information. The verified SIP data and CNAM information are stored in a third-party database for further analysis, ensuring that all authentication and verification details are available for subsequent processing. The SIP data and CNAM information are analyzed using an artificial intelligence and machine learning (AI/ML) engine to detect anomalies, such as calls from blocked regions, abnormal call durations, and new calls from unusual locations, by comparing the SIP data against known patterns of legitimate and fraudulent calls. If the AI/ML engine detects potential fraud based on the analysis of the SIP data and CNAM information, the call is blocked and the customer is notified, preventing the fraudulent call from reaching the customer.

If the AI/ML engine is indecisive, the call is allowed to proceed and real-time speech analysis is performed using the Viterbi algorithm, which converts the spoken language into text by determining the most probable sequence of states given the sequence of observed acoustic features, including phonemes and words. The converted text along with the SIP data and CNAM information is processed using an anomaly pattern detector to identify vishing patterns, such as sudden spikes in call volume, typical vishing patterns, differences in voice signal ranges, and requests for sensitive information, by analyzing both the linguistic content and the call metadata.

If the anomaly pattern detector identifies a match with known vishing patterns, the call is terminated and the customer is informed, thereby preventing the continuation of the fraudulent call and alerting the customer to the attempted scam. The method also includes continuing to monitor and process the call if no suspicious patterns are detected, ensuring ongoing security by periodically re-evaluating the call data and updating the AI/ML engine with new information to adapt to evolving vishing tactics.

In some arrangements, the detailed authentication information in the SIP header includes full attestation, partial attestation, or gateway attestation based on the level of verification performed on the caller's identity, with full attestation indicating the highest level of confidence in the caller's authenticity.

In some arrangements, the STIR/SHAKEN framework uses public key cryptography to generate the digital certificates that are used to verify the authenticity of the calling number, ensuring that the calling number cannot be easily spoofed by malicious actors.

In some arrangements, the verification service at the destination service provider utilizes a certificate repository to validate the digital certificates included in the SIP Identity header, comparing the certificates against trusted sources to ensure their validity.

In some arrangements, the third-party database is a cloud-based application integrated with the telephone service provider to store detailed authentication and verification data for real-time and post-call analysis, enabling continuous monitoring and rapid response to detected anomalies.

In some arrangements, the AI/ML engine continuously learns from new data and evolving threat patterns to improve its accuracy in detecting anomalies, incorporating feedback from previously detected fraudulent calls to enhance its predictive capabilities.

In some arrangements, the Viterbi algorithm integrates acoustic models, language models, and pronunciation models to accurately transcribe and analyze the speech in real-time, providing a detailed linguistic analysis that helps identify suspicious conversational patterns.

In some arrangements, the anomaly pattern detector uses machine learning techniques to recognize known vishing patterns based on the converted text and SIP data, identifying specific indicators of fraudulent activity such as urgent requests for personal information or inconsistencies in the caller's speech.

In some arrangements, the customer is notified of the potential fraud attempt through an alert message sent to their device upon call termination, including details of the detected threat and recommendations for further actions to protect their information.

In some arrangements, the continuous monitoring and processing of the call involve periodic re-analysis of the call data to ensure ongoing security against vishing attacks, updating the AI/ML engine with the latest threat intelligence and adapting to new scam tactics as they emerge.

In some arrangements, an information-security system for detecting and preventing vishing attacks comprises an originating service provider configured to initiate a call and send a Session Initiation Protocol (SIP) invite, wherein the SIP invite includes detailed authentication information in the SIP header, such as caller identity, caller location, and call initiation timestamp. The system includes a STIR/SHAKEN framework integrated with the originating service provider, configured to transmit the call data and employ digital certificates to verify the authenticity of the calling number, ensuring that the caller ID has not been spoofed.

A destination service provider is configured to receive the SIP data and verify the transmitted data using a verification service, wherein the verification service decodes the SIP Identity header containing a JSON web token (JWT) with attestation details, origin and destination identifiers, and timestamps to confirm the validity of the calling number. A Caller Name (CNAM) database is configured to cross-reference the verified data and retrieve additional caller identification information. The system further includes a third-party database integrated with the destination service provider, configured to store the verified SIP data and CNAM information for further analysis.

An artificial intelligence and machine learning (AI/ML) engine is configured to analyze the SIP data and CNAM information to detect anomalies, such as calls from blocked regions, abnormal call durations, and new calls from unusual locations, by comparing the SIP data against known patterns of legitimate and fraudulent calls. A call blocking module is integrated with the AI/ML engine, configured to block the call and notify the customer if the AI/ML engine detects potential fraud based on the analysis of the SIP data and CNAM information. A speech analysis module is configured to allow the call to proceed if the AI/ML engine is indecisive, and perform real-time speech analysis using the Viterbi algorithm, which converts the spoken language into text by determining the most probable sequence of states given the sequence of observed acoustic features, including phonemes and words.

An anomaly pattern detector is integrated with the speech analysis module, configured to process the converted text along with the SIP data and CNAM information to identify vishing patterns, such as sudden spikes in call volume, typical vishing patterns, differences in voice signal ranges, and requests for sensitive information, by analyzing both the linguistic content and the call metadata.

A call termination module is configured to terminate the call and inform the customer if the anomaly pattern detector identifies a match with known vishing patterns, thereby preventing the continuation of the fraudulent call and alerting the customer to the attempted scam. A continuous monitoring module is configured to monitor and process the call if no suspicious patterns are detected, ensuring ongoing security by periodically re-evaluating the call data and updating the AI/ML engine with new information to adapt to evolving vishing tactics.

In some arrangements, the detailed authentication information in the SIP header includes full attestation, partial attestation, or gateway attestation based on the level of verification performed on the caller's identity, with full attestation indicating the highest level of confidence in the caller's authenticity.

In some arrangements, the STIR/SHAKEN framework uses public key cryptography to generate the digital certificates that are used to verify the authenticity of the calling number, ensuring that the calling number cannot be easily spoofed by malicious actors.

In some arrangements, the verification service at the destination service provider utilizes a certificate repository to validate the digital certificates included in the SIP Identity header, comparing the certificates against trusted sources to ensure their validity.

In some arrangements, the third-party database is a cloud-based application integrated with the telephone service provider to store detailed authentication and verification data for real-time and post-call analysis, enabling continuous monitoring and rapid response to detected anomalies.

In some arrangements, the AI/ML engine continuously learns from new data and evolving threat patterns to improve its accuracy in detecting anomalies, incorporating feedback from previously detected fraudulent calls to enhance its predictive capabilities.

In some arrangements, the Viterbi algorithm integrates acoustic models, language models, and pronunciation models to accurately transcribe and analyze the speech in real-time, providing a detailed linguistic analysis that helps identify suspicious conversational patterns.

In some arrangements, the anomaly pattern detector uses machine learning techniques to recognize known vishing patterns based on the converted text and SIP data, identifying specific indicators of fraudulent activity such as urgent requests for personal information or inconsistencies in the caller's speech.

In some arrangements, the customer is notified of the potential fraud attempt through an alert message sent to their device upon call termination, including details of the detected threat and recommendations for further actions to protect their information.

In some arrangements, the continuous monitoring and processing of the call involve periodic re-analysis of the call data to ensure ongoing security against vishing attacks, updating the AI/ML engine with the latest threat intelligence and adapting to new scam tactics as they emerge.

In additional embodiments, in some arrangements, a method for phishing detection and call screening using web crawling, web scraping, machine learning, and real-time speech analysis includes deploying a web crawler to identify and retrieve web pages potentially associated with phishing activities by continuously scanning the internet for new or modified web pages that match predefined criteria indicative of phishing attempts. The method also involves using a web scraping agent to extract content from the retrieved web pages, including text, images, and metadata, to create a comprehensive dataset for analysis. Additionally, the method includes performing feature engineering on the extracted content to generate a set of features indicative of phishing characteristics, such as suspicious URLs, unusual domain names, and specific keywords commonly found in phishing attacks.

The method further includes training a random forest algorithm on a dataset comprising known phishing and legitimate web pages to create a trained phishing detection model, utilizing supervised learning techniques to enhance the model's accuracy. The trained phishing detection model is then applied to the set of features to classify the web pages as phishing or legitimate, providing a probabilistic score for each classification to indicate the confidence level of the prediction. The phishing detection model is integrated into a system's security infrastructure to provide real-time phishing detection and alerts, ensuring that potential threats are identified and addressed promptly.

The method also includes updating the phishing detection model periodically with new data to improve accuracy and adapt to emerging phishing tactics, utilizing continuous integration and deployment practices to maintain the model's effectiveness. It involves generating a report on detected phishing activities, including details on the identified phishing web pages, the features used for classification, and the confidence scores, to provide comprehensive insights into the phishing threats. A feedback mechanism is implemented to refine the web crawler and web scraping agent based on detection results and user inputs, allowing for iterative improvements in the system's performance.

The method ensures compliance with relevant data protection regulations throughout the phishing detection process, including anonymizing sensitive data and adhering to privacy standards. It provides an interface for users to review and manage detected phishing incidents, offering tools for users to report false positives or confirm detections to further refine the detection model. Additionally, the method includes deploying a machine learning engine integrated with the Session Initiation Protocol (SIP) to attempt caller identification before transitioning to a voice call, enhancing the initial screening process by leveraging detailed caller information.

The method involves augmenting the SIP invite with detailed authentication information about the caller, including identity, location, and call initiation timestamp, to enable a thorough assessment of the call's legitimacy. The SIP invite information is analyzed with the machine learning engine, comparing it against known patterns of legitimate and fraudulent calls, using a model trained on a vast dataset to identify indicators of potential scams. If the machine learning engine determines the call to be likely unwanted or spam, the method includes blocking the call at or before the initiation stage, preventing it from reaching the recipient and reducing the number of unwanted calls received.

If the SIP-based identification remains inconclusive, the method employs an anomaly detection engine using the Viterbi algorithm to analyze the caller's speech patterns during voicemail messages, leveraging advanced speech recognition and analysis techniques. The method identifies suspicious characteristics in the voicemail analysis, such as unusual speech patterns, inconsistencies, high-pressure tactics, or keywords associated with spam, by comparing the voicemail content to known scam scripts and behavioral patterns. If suspicious characteristics are detected during voicemail analysis, the method automatically blocks any callback attempts from the recipient, preventing further engagement by potential scammers.

The method includes notifying the customer of the potential spam or unwanted call and providing detailed information about the detected threat, including the reasons for the suspicion and any relevant patterns identified. The detection capabilities of the system are continuously improved by adapting to new scam tactics through an adaptive learning process, ensuring the system remains effective against evolving threats. The method integrates the system with existing telecommunications infrastructure to enhance security measures without requiring significant changes, ensuring compatibility and ease of deployment for service providers.

The method provides insights and analytics to service providers by analyzing call patterns and identifying common characteristics of spam and fraud to develop new strategies for enhancing call security, offering valuable data for proactive threat management.

In some arrangements, the web crawler is configured to use multiple search engines and social media platforms to identify a broader range of potentially malicious web pages. This expanded search capability allows the system to cast a wider net, increasing the likelihood of detecting phishing activities across diverse sources on the internet.

In some arrangements, the web scraping agent includes natural language processing (NLP) capabilities to analyze the textual content for context and sentiment. By leveraging NLP, the system enhances the accuracy of feature extraction, enabling it to better understand the nuances of the content and identify potential phishing characteristics with greater precision.

In some arrangements, the feature engineering process incorporates user behavioral data such as click patterns and browsing history. This additional data improves the detection model's ability to distinguish between phishing and legitimate web pages by providing a richer context for understanding user interactions and identifying abnormal behaviors indicative of phishing.

In some arrangements, the phishing detection model is periodically retrained using a federated learning approach. This method enables the integration of new data from multiple sources without compromising user privacy, ensuring that the model remains up-to-date and effective against the latest phishing tactics while protecting user confidentiality.

In some arrangements, the system's security infrastructure includes an automated response mechanism that can quarantine or block access to identified phishing web pages in real-time. This proactive approach ensures that threats are neutralized immediately, minimizing the risk of users falling victim to phishing attacks.

In some arrangements, the interface provided for users includes customizable alert settings. These settings allow users to specify their preferred notification methods and sensitivity levels for phishing detection, providing a tailored experience that meets individual security needs and preferences.

In some arrangements, the machine learning engine integrated with the Session Initiation Protocol (SIP) utilizes a multi-layer perceptron (MLP) network to enhance the accuracy of caller identification. The use of an MLP network improves the system's ability to accurately classify callers based on the detailed authentication information provided in the SIP invite.

In some arrangements, the anomaly detection engine employing the Viterbi algorithm is supplemented with a secondary algorithm, such as Hidden Markov Models (HMM). This combination of algorithms improves the detection of complex speech patterns indicative of fraudulent activity, providing a more robust analysis of voicemail messages.

In some arrangements, the system provides a detailed analytics dashboard for service providers. This dashboard includes metrics on call blocking rates, types of detected scams, and geographical distribution of fraud attempts. These insights aid in strategic decision-making and resource allocation, helping service providers enhance their overall security posture and better protect their customers.

In some arrangements, a system for phishing detection and call screening comprises a web crawler configured to continuously scan the internet and retrieve web pages potentially associated with phishing activities by matching predefined criteria indicative of phishing attempts. The system also includes a web scraping agent operatively connected to the web crawler, which is configured to extract content from the retrieved web pages, including text, images, and metadata.

In some arrangements, the system includes a feature engineering module configured to process the extracted content to generate a set of features indicative of phishing characteristics, such as suspicious URLs, unusual domain names, and specific keywords commonly found in phishing attacks. The system also comprises a machine learning model with a random forest algorithm trained on a dataset of known phishing and legitimate web pages, which is configured to classify the web pages as phishing or legitimate based on the generated set of features.

In some arrangements, the system features a real-time detection engine operatively connected to the machine learning model, which is configured to apply the model to the set of features and provide real-time phishing detection and alerts. Additionally, the system includes a model update module configured to periodically update the machine learning model with new data to improve accuracy and adapt to emerging phishing tactics.

In some arrangements, the system comprises a reporting module configured to generate reports on detected phishing activities, including details on the identified phishing web pages, the features used for classification, and the confidence scores. The system also includes a feedback mechanism integrated into the web crawler and web scraping agent, configured to refine their operations based on detection results and user inputs.

In some arrangements, the system features a compliance module configured to ensure that the system adheres to relevant data protection regulations throughout the phishing detection process. The system also provides a user interface configured to allow users to review and manage detected phishing incidents, report false positives, and confirm detections.

In some arrangements, the system includes a Session Initiation Protocol (SIP) module configured to process SIP invites with detailed authentication information about the caller, including identity, location, and call initiation timestamp. The system also comprises a caller identification engine with a machine learning model trained on a dataset of legitimate and fraudulent calls, which is configured to analyze the SIP invite information and determine the legitimacy of the caller.

In some arrangements, the system features a call blocking module operatively connected to the caller identification engine, which is configured to block calls at the initiation stage if determined to be likely unwanted or spam. Additionally, the system includes an anomaly detection engine employing the Viterbi algorithm, configured to analyze the caller's speech patterns during voicemail messages if the SIP-based identification remains inconclusive.

In some arrangements, the system comprises a voicemail analysis module configured to identify suspicious characteristics in the voicemail analysis, such as unusual speech patterns, inconsistencies, high-pressure tactics, or keywords associated with spam. The system also includes a callback blocking module configured to automatically block any callback attempts from the recipient if suspicious characteristics are detected during voicemail analysis.

In some arrangements, the system features a notification module configured to notify the customer of the potential spam or unwanted call and provide detailed information about the detected threat. The system also includes an adaptive learning module configured to continuously improve the detection capabilities of the system by adapting to new scam tactics.

In some arrangements, the system comprises an integration module configured to ensure compatibility with existing telecommunications infrastructure, enhancing security measures without requiring significant changes. Additionally, the system includes an analytics dashboard for service providers, which is configured to provide insights and analytics on call patterns, characteristics of spam and fraud, and metrics on call blocking rates.

In some arrangements, a method for phishing detection and call screening using web crawling, web scraping, machine learning, and real-time speech analysis includes deploying a web crawler to identify and retrieve web pages potentially associated with phishing activities. The method also involves using a web scraping agent to extract content from the retrieved web pages, including text, images, and metadata.

In some arrangements, the method includes performing feature engineering on the extracted content to generate a set of features indicative of phishing characteristics, such as suspicious URLs, unusual domain names, and specific keywords commonly found in phishing attacks. The method also involves training a random forest algorithm on a dataset comprising known phishing and legitimate web pages to create a trained phishing detection model.

In some arrangements, the method includes applying the trained phishing detection model to the set of features to classify the web pages as phishing or legitimate. The phishing detection model is then integrated into a system's security infrastructure to provide real-time phishing detection and alerts, ensuring that potential threats are identified and addressed promptly.

In some arrangements, the method includes updating the phishing detection model periodically with new data to improve accuracy and adapt to emerging phishing tactics. The method also involves generating a report on detected phishing activities, including details on the identified phishing web pages and the features used for classification.

In some arrangements, the method includes implementing a feedback mechanism to refine the web crawler and web scraping agent based on detection results and user inputs, allowing for iterative improvements in the system's performance. The method also ensures compliance with relevant data protection regulations throughout the phishing detection process, including anonymizing sensitive data and adhering to privacy standards.

In some arrangements, the method provides an interface for users to review and manage detected phishing incidents, offering tools for users to report false positives or confirm detections to further refine the detection model. The method also includes deploying a machine learning engine integrated with the Session Initiation Protocol (SIP) to attempt caller identification before transitioning to a voice call.

In some arrangements, the method involves augmenting the SIP invite with detailed authentication information about the caller, including identity, location, and call initiation timestamp. The method then analyzes the SIP invite information with the machine learning engine, comparing it against known patterns of legitimate and fraudulent calls.

In some arrangements, the method includes blocking the call at the initiation stage if the machine learning engine determines it to be likely unwanted or spam. If the SIP-based identification remains inconclusive, the method employs an anomaly detection engine using the Viterbi algorithm to analyze the caller's speech patterns during voicemail messages.

In some arrangements, the method involves identifying suspicious characteristics in the voicemail analysis, such as unusual speech patterns, inconsistencies, high-pressure tactics, or keywords associated with spam. If suspicious characteristics are detected during voicemail analysis, the method automatically blocks any callback attempts from the recipient.

In some arrangements, the method includes notifying the customer of the potential spam or unwanted call and providing detailed information about the detected threat. The method continuously improves the detection capabilities of the system by adapting to new scam tactics through an adaptive learning process.

In some arrangements, the method integrates the system with existing telecommunications infrastructure to enhance security measures without requiring significant changes. The method also provides insights and analytics to service providers by analyzing call patterns and identifying common characteristics of spam and fraud to develop new strategies for enhancing call security.

In further embodiments, an information-security method for detecting and preventing in-person bank fraud comprises the steps of entering a customer's application details into an AI/ML engine, wherein the application details include personal identification information, account numbers, transaction requests, and other relevant data to initiate the fraud detection process. The method further involves analyzing the application data using the AI/ML engine, wherein the AI/ML engine is specifically trained to identify inconsistencies, falsified information, or unusual requests that might indicate potential fraud, by comparing the application data against a vast database of legitimate and fraudulent transactions to detect patterns such as mismatched information, unusually large transactions, or requests that deviate from the customer's typical banking behavior, ensuring comprehensive scrutiny of the provided data. Simultaneously, a real-time conversation analysis engine is run on the associate's device, wherein the conversation analysis engine is equipped with advanced speech recognition algorithms to monitor the live conversation between the bank associate and the customer for any signs of deceit or fraudulent intent. The spoken dialogue between the bank associate and the customer is converted into text using the speech recognition algorithms, wherein the conversation analysis engine performs real-time transcription of the conversation to facilitate detailed examination of the verbal interactions. The conversation text is analyzed using the conversation analysis engine to detect suspicious speech patterns, hesitations, inconsistencies in the story, or the use of high-pressure tactics, and identifying keywords and phrases commonly associated with fraudulent activities, such as urgent requests for immediate action or reluctance to provide certain information, thereby enhancing the ability to identify potential fraud through linguistic analysis. The analysis results from both the application data and the conversation are combined to create a comprehensive risk assessment, wherein the dual analysis ensures that both the verbal and non-verbal cues are considered to provide a holistic view of the potential fraud, enhancing the accuracy and reliability of the fraud detection system. If a high probability of fraud is detected, an alert is triggered, wherein the alert is sent to the bank associate, security personnel, and other relevant individuals within the bank, and includes detailed information about the reasons for suspicion to help the staff make informed decisions about how to proceed, ensuring timely and effective response to potential fraud. Associates are empowered to take immediate action based on the alert to prevent fraudulent transactions, including verifying additional details with the customer, consulting with security personnel, or denying the transaction if necessary, thereby mitigating the risk of fraud and protecting both the bank and the customer from potential financial losses, and enhancing the overall security of the banking operations. The system is continuously updated with new data and threat patterns to enhance the detection capabilities of the AI/ML engine, wherein the AI/ML engine learns from each interaction, improving its accuracy and detection capabilities over time through a continuous learning process that allows the system to adapt to new fraud tactics, ensuring the system remains effective against evolving fraud techniques. Subsequent activities on the account are monitored if a transaction is flagged but allowed to proceed, including tracking the movement of funds, monitoring for unusual withdrawals, and analyzing further interactions with the bank, and alerting the bank's security team if any additional suspicious activities are detected to ensure ongoing protection against fraud, thereby providing a multi-layered defense mechanism that extends beyond the initial transaction to safeguard the customer's account continuously.

In some arrangements, the AI/ML engine uses supervised learning techniques trained on a dataset comprising known legitimate and fraudulent transactions to improve the accuracy of fraud detection. In some arrangements, the real-time conversation analysis engine identifies speech patterns associated with stress or nervousness, which may indicate deceitful behavior. In some arrangements, the alert triggered by the system includes suggested actions for the bank associate to take in response to the suspected fraud, such as additional verification questions or requesting secondary identification. In some arrangements, the system logs all alerts and actions taken by the bank associates for audit and review purposes, allowing for continuous improvement of the fraud detection process. In some arrangements, the continuous updates to the AI/ML engine include feedback from bank associates on the effectiveness of the fraud detection and prevention measures, enhancing the engine's learning capabilities. In some arrangements, the system integrates with the bank's existing customer relationship management (CRM) system to provide a unified view of the customer's interactions and potential fraud alerts. In some arrangements, the system employs multi-factor authentication for accessing the fraud detection system to ensure that only authorized personnel can respond to alerts and take action. In some arrangements, the system uses encrypted communication channels to transmit alerts and sensitive customer data to prevent unauthorized access and ensure data integrity.

In some arrangements, an information-security system for detecting and preventing in-person bank fraud comprises a data input module configured to receive customer application details, including personal identification information, account numbers, transaction requests, and other relevant data. The system includes an artificial intelligence and machine learning (AI/ML) engine configured to analyze the application data for inconsistencies, falsified information, or unusual requests by comparing the application data against a vast database of legitimate and fraudulent transactions to detect patterns such as mismatched information, unusually large transactions, or requests that deviate from the customer's typical banking behavior. Additionally, the system features a real-time conversation analysis engine equipped with speech recognition algorithms, configured to run on an associate's device to monitor the live conversation between the bank associate and the customer, converting spoken dialogue into text for further analysis. A speech analysis module within the conversation analysis engine is configured to detect suspicious speech patterns, hesitations, inconsistencies in the story, high-pressure tactics, and keywords or phrases commonly associated with fraudulent activities, such as urgent requests for immediate action or reluctance to provide certain information. The system also includes a risk assessment module configured to combine the analysis results from both the application data and the conversation to create a comprehensive risk assessment, ensuring that both verbal and non-verbal cues are considered to provide a holistic view of the potential fraud. An alert generation module is configured to trigger an alert if a high probability of fraud is detected, wherein the alert is sent to the bank associate, security personnel, and other relevant individuals within the bank, including detailed information about the reasons for suspicion to help the staff make informed decisions about how to proceed. An action module within the system is configured to empower bank associates to take immediate action based on the alert, including verifying additional details with the customer, consulting with security personnel, or denying the transaction if necessary. Furthermore, the system includes a continuous learning module within the AI/ML engine, configured to update the system with new data and threat patterns, enhancing the detection capabilities of the AI/ML engine by learning from each interaction to improve its accuracy and adapt to new fraud tactics. Lastly, a post-transaction monitoring module is configured to monitor subsequent activities on the account if a transaction is flagged but allowed to proceed, tracking the movement of funds, monitoring for unusual withdrawals, and analyzing further interactions with the bank, and alerting the bank's security team if any additional suspicious activities are detected.

In some arrangements, the AI/ML engine uses supervised learning techniques trained on a dataset comprising known legitimate and fraudulent transactions to improve the accuracy of fraud detection. In some arrangements, the real-time conversation analysis engine identifies speech patterns associated with stress or nervousness, which may indicate deceitful behavior. In some arrangements, the alert generation module includes suggested actions for the bank associate to take in response to the suspected fraud, such as additional verification questions or requesting secondary identification. In some arrangements, the system logs all alerts and actions taken by the bank associates for audit and review purposes, allowing for continuous improvement of the fraud detection process. In some arrangements, the continuous learning module incorporates feedback from bank associates on the effectiveness of the fraud detection and prevention measures, enhancing the engine's learning capabilities. In some arrangements, the system integrates with the bank's existing customer relationship management (CRM) system to provide a unified view of the customer's interactions and potential fraud alerts. In some arrangements, the system employs multi-factor authentication for accessing the fraud detection system to ensure that only authorized personnel can respond to alerts and take action. In some arrangements, the system uses encrypted communication channels to transmit alerts and sensitive customer data to prevent unauthorized access and ensure data integrity.

In some arrangements, an information-security method for detecting and preventing in-person bank fraud comprises the steps of entering a customer's application details into an AI/ML engine. The application details include personal identification information, account numbers, transaction requests, and other relevant data. The method further involves analyzing the application data for inconsistencies, falsified information, or unusual requests using the AI/ML engine. The AI/ML engine compares the application data against a vast database of legitimate and fraudulent transactions to detect patterns such as mismatched information, unusually large transactions, or requests that deviate from the customer's typical banking behavior. Simultaneously, the method involves running a real-time conversation analysis engine on the associate's device. This engine is equipped with speech recognition algorithms to monitor the live conversation between the associate and the customer. The spoken dialogue is converted into text using the speech recognition algorithms. The conversation text is analyzed for suspicious speech patterns, hesitations, or keywords often associated with scams. The analysis results from both the application data and the conversation are combined to create a comprehensive risk assessment. If a high probability of fraud is detected, an alert is triggered, notifying the associate, security personnel, and other relevant individuals. Associates are empowered to take immediate action based on the alert to prevent fraudulent transactions. The system is continuously updated with new data and threat patterns to enhance the detection capabilities of the AI/ML engine. Additionally, the system monitors subsequent activities on the account if a transaction is flagged but allowed to proceed and alerts the bank's security team if additional suspicious activities are detected.

In some arrangements, the method further comprises the steps of integrating the AI/ML engine with a centralized database that aggregates data from multiple branches and external sources. These sources include data from other financial institutions, regulatory bodies, and public records. This integration enhances the comprehensiveness and accuracy of the fraud detection process by providing a broader context for analyzing customer application details and transactional behavior. The method also involves implementing a feedback loop within the AI/ML engine. The engine receives and processes real-time feedback from bank associates and security personnel regarding the accuracy and effectiveness of detected fraud alerts, allowing the system to continuously refine its algorithms and improve its predictive capabilities. Furthermore, advanced natural language processing (NLP)

techniques are utilized within the real-time conversation analysis engine to detect nuanced linguistic indicators of deception. These indicators include specific syntactic patterns, emotional undertones, and changes in speech tempo or volume, thereby increasing the sensitivity and specificity of the fraud detection system. When an alert is triggered, a detailed fraud analysis report is provided to the bank associate and security personnel. The report includes a summary of the detected inconsistencies in the application data, the suspicious speech patterns identified in the conversation, and any relevant historical data on the customer's previous interactions and transaction history, enabling a more informed decision-making process. Secure communication channels are enabled for transmitting fraud alerts and reports to ensure that sensitive information is protected from unauthorized access and tampering. End-to-end encryption and secure messaging protocols are utilized to maintain data integrity and confidentiality. Periodic training sessions are conducted for bank associates on the latest fraud detection techniques and system updates. The training includes hands-on exercises with simulated fraud scenarios to improve the associates' ability to recognize and respond to potential fraud in real-time. A dedicated fraud investigation unit is established within the bank's security team. This unit is equipped with advanced analytical tools and access to the centralized database to conduct in-depth investigations of flagged transactions and collaborate with external law enforcement agencies when necessary to address and mitigate fraud risks. Finally, the method involves deploying automated fraud prevention measures that can be triggered by the system. These measures include temporarily freezing the customer's account or placing a hold on suspicious transactions to prevent further fraudulent activity while the alert is being reviewed and investigated by the bank's security team.

The following description and claims, in conjunction with the drawings—all integral parts of this specification—will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 2 is a sample system diagram that depicts the interactions between the scammer, originating and terminating service providers, and the verification and AI/ML systems, showing the flow of data and the decision-making process involved in detecting and blocking vishing attempts. It emphasizes the roles of the SIP identity header, digital certificates, and anomaly pattern detection in ensuring call security and authenticity.

FIG. 5 illustrates a sample information-security method for detecting and preventing vishing attacks, detailing steps such as initiating a call, verifying caller identity using the STIR/SHAKEN framework, and analyzing call data with AI/ML to detect and block potential fraud. The method includes real-time speech analysis and continuous monitoring to adapt to evolving vishing tactics.

FIG. 7 is a sample pseudocode diagram corresponding to the flow chart of FIG. 6 in accordance with one or more embodiments of the present invention.

FIGS. 8-9 illustrate a sample pseudocode diagram that addresses in-person bank fraud through advanced data analysis and real-time threat conversational monitoring.

DETAILED DESCRIPTION

Figure 1:
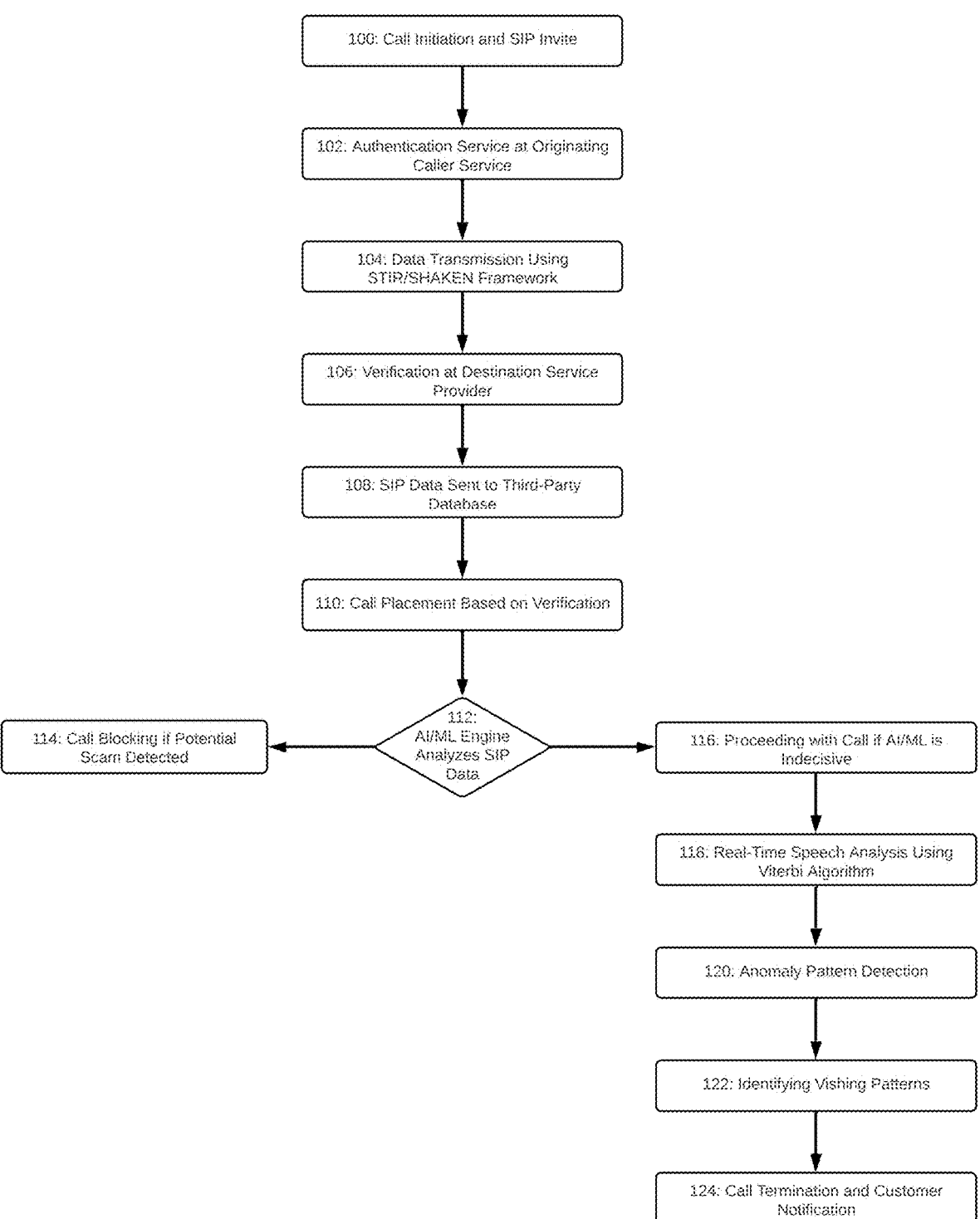
FIG. 1 illustrates a sample, technical, process flow for detecting and preventing vishing attacks, starting from call initiation and SIP invite, progressing through various stages of authentication, verification, AI/ML analysis, and real-time speech analysis, and ending with call termination and customer notification if a potential scam is detected. It highlights the integration of the STIR/SHAKEN framework, third-party database, and Viterbi algorithm in the system.

In a first aspect, at a high level, the system and method inventions disclosed herein offer comprehensive solutions to vishing, a type of fraud where scammers use voice communications to extract sensitive information. It leverages advanced technologies and methodologies to detect and prevent such attacks effectively. At its core, the inventions integrate detailed SIP header customization, the STIR/SHAKEN framework, third-party databases, AI/ML engines, and the Viterbi algorithm.

The system begins by customizing the SIP header to include detailed authentication information about the caller, which is crucial for the verification process. This data is then transmitted using the STIR/SHAKEN framework, which utilizes digital certificates to ensure the authenticity of the calling number, thereby preventing caller ID spoofing. Once the call data is transmitted, the verification service at the destination provider checks the SIP Identity header, which contains a JSON web token (JWT) with encoded authentication details. This ensures the legitimacy of the call.

The SIP data is also sent to a third-party database, typically a cloud-based application integrated with the telephone service provider, for further analysis. This database serves as a repository for the detailed authentication and verification data, enabling the AI/ML engine to access and analyze the data in real-time. The AI/ML engine utilizes machine learning algorithms to assess the SIP data for any anomalies that might indicate a potential scam, considering various parameters such as calls from blocked regions, abnormal call durations, and new calls from unusual locations. If the AI/ML engine detects any anomalies suggesting that the caller might be a scammer, the call is blocked, and the customer is immediately notified. This proactive approach helps prevent fraudulent interactions before they can cause harm.

However, if the AI/ML engine is unable to conclusively determine the risk based on the SIP data alone, the call is allowed to proceed, undergoing further scrutiny using the Viterbi algorithm. The Viterbi algorithm plays a key role in analyzing the real-time conversation between the caller and the recipient. This algorithm converts the spoken language into text, facilitating a detailed examination of the conversation by determining the most probable sequence of states given the sequence of observed acoustic features. It combines various models, including acoustic models, language models, and pronunciation models, to accurately transcribe and analyze the speech.

Once the speech is converted to text, the anomaly pattern detector processes the text along with the SIP data. This detector is another layer of the AI system, designed to identify patterns indicative of vishing attacks by looking for sudden spikes in call volume, typical vishing patterns, differences in voice signal ranges, and requests for sensitive information. If the anomaly pattern detector identifies a match with known vishing patterns, the call is terminated immediately, and the customer is informed of the potential fraud attempt. This final step ensures that even if a scammer manages to bypass the initial AI/ML engine checks, they are still caught and stopped by the real-time analysis and pattern detection processes.

The integration of these technologies into a cohesive system provides a comprehensive solution to the problem of vishing, significantly enhancing the security of voice communications and protecting customers from fraud. The system not only enhances the security of voice communications but also provides peace of mind to customers, knowing that their calls are being monitored and protected from potential scams. This multi-layered approach, combining SIP customization, robust frameworks, real-time analysis, and continuous learning, provides a powerful defense against vishing, ensuring that fraudulent activities are detected and mitigated swiftly.

In a second high-level aspect, the invention expands its core functionality with innovative approaches to enhance security measures. One of the additional aspects involves systems and methods that integrate a machine learning engine with the Session Initiation Protocol (SIP) to identify callers before transitioning to a voice call. This pre-call identification method can potentially block unwanted calls at the initiation stage. If the SIP-based identification is inconclusive, an anomaly detection engine using the Viterbi algorithm analyzes the caller's speech patterns in voicemail messages to detect suspicious characteristics, thereby blocking callback attempts and notifying the customer of potential spam or unwanted calls. This dual-phase approach ensures both pre-call and post-call phases are monitored for fraudulent activity.

The machine learning engine analyzes SIP invites augmented with detailed authentication information about the caller, such as caller ID, location, and context. Trained on a vast dataset of legitimate and fraudulent calls, the engine assesses the legitimacy of the caller by identifying patterns indicative of potential scams. When a call is initiated, the SIP invite from the originating service provider includes the caller's identity, location, and call initiation timestamp, which the machine learning engine processes in real-time to determine the call's legitimacy.

If the engine identifies the call as likely spam, it blocks the call before it reaches the recipient, significantly reducing unwanted calls and enhancing customer security. When SIP-based identification is inconclusive, a secondary analysis layer uses the Viterbi algorithm to analyze the caller's speech patterns in voicemails. The algorithm converts spoken language into text and examines speech for characteristics such as tone, pitch, pauses, and keywords often associated with spam or fraudulent calls.

The system looks for key indicators of suspicious activity during voicemail analysis, such as unusual speech patterns, inconsistencies in spoken information, and high-pressure tactics or urgent language. If such characteristics are identified, the system blocks any callback attempts from the recipient and notifies the customer with detailed information about the detected threat. This notification helps the customer understand and trust the system's decision, preventing further engagement with potential scammers.

By integrating SIP-based identification with real-time voicemail analysis, the invention offers a comprehensive approach to call screening. The use of machine learning and advanced speech analysis techniques allows continuous improvement in detection capabilities, adapting to new scam tactics as they emerge. This adaptive learning process ensures long-term protection for customers against evolving threats.

The invention can be integrated with existing telecommunications infrastructure without significant changes, making it a cost-effective solution for service providers. The system's real-time operation protects customers from scams as they happen, rather than relying on reactive measures. Another advantage is its scalability, allowing the machine learning engine and anomaly detection algorithms to handle a large volume of calls simultaneously, suitable for both individual users and large organizations.

In addition to blocking unwanted calls and notifying customers, the system provides valuable insights and analytics to service providers. By analyzing call patterns and identifying common characteristics of spam and fraud, the system helps providers understand and mitigate risks associated with fraudulent calls. These insights can aid in developing new strategies and technologies to enhance call security further.

Overall, this additional aspect of the invention offers a robust and multi-layered approach to call screening and fraud prevention. By leveraging machine learning, SIP-based identification, and real-time speech analysis, the system provides comprehensive protection against unwanted and fraudulent calls. The combination of pre-call and post-call analysis ensures that every aspect of a call is scrutinized, providing customers with high security and peace of mind.

The system's adaptability, scalability, and ease of integration make it a valuable addition to any telecommunications infrastructure, enhancing the overall security and reliability of voice communications. By continuously monitoring and controlling every possible avenue for fraudulent activity, the invention significantly improves the customer experience and trust in telecommunications services.

In a third high-level aspect, the invention introduces yet another aspect focused on combatting in-person bank fraud, which has become increasingly sophisticated and difficult to detect. This aspect integrates advanced AI/ML engines with real-time conversational monitoring to create a comprehensive fraud detection system. When a customer's application details raise suspicion, they are analyzed by an AI/ML engine for inconsistencies, falsified information, or unusual requests that might indicate potential fraud. Simultaneously, a real-time conversation analysis engine equipped with speech recognition algorithms monitors the dialogue between the bank associate and the customer, identifying suspicious speech patterns, hesitations, or keywords often associated with scams.

The process begins with the entry of customer application details into the system, including personal identification, account numbers, and transaction requests. The AI/ML engine, trained on a vast dataset of legitimate and fraudulent transactions, analyzes this data for discrepancies and unusual patterns. Simultaneously, the real-time conversation analysis engine converts spoken dialogue into text, allowing the system to detect signs of deceit through speech patterns and specific keywords associated with fraud.

By combining data analysis and conversation monitoring, the system creates a comprehensive risk assessment, ensuring that both verbal and non-verbal cues are considered. If both the AI/ML engine and the conversation analysis indicate a high probability of fraud, an alert is triggered, notifying the bank associate, security personnel, and other relevant individuals. This alert includes detailed information about the reasons for suspicion, empowering staff to make informed decisions on how to proceed.

This real-time alert system enables bank associates to take immediate action, such as verifying additional details with the customer, consulting security personnel, or denying the transaction if necessary. This proactive approach mitigates the risk of fraud, protecting both the bank and the customer from potential financial losses. Moreover, the system is continuously updated with new data and threat patterns, ensuring it remains effective against emerging fraud techniques.

The AI/ML engine learns from each interaction, improving its accuracy and detection capabilities over time. This continuous learning process allows the system to adapt to new fraud tactics, providing long-term security for the bank and its customers. Additionally, the system includes features for post-transaction analysis, monitoring subsequent account activities for signs of fraud and alerting the bank's security team if any suspicious activities are detected.

The system can also identify customers who may be vulnerable to manipulation or coercion by analyzing speech patterns and behavior. This capability is particularly valuable for protecting vulnerable individuals, such as the elderly, from fraudsters. The invention's integration into the bank's existing infrastructure is designed to be seamless, requiring minimal changes to operational processes and making it a cost-effective solution for enhancing security.

The system can be deployed on standard hardware used by bank associates, leveraging cloud-based services for data analysis and storage. This ensures quick and easy implementation across multiple branches. Another key advantage of this invention is its scalability, allowing it to handle a high volume of transactions and interactions simultaneously, making it suitable for both small branches and large financial institutions.

The invention also provides valuable insights and analytics to the bank's management team by analyzing data on fraudulent transactions and suspicious activities. These insights can help identify trends and patterns that may indicate systemic vulnerabilities, which can then be addressed through targeted training programs for staff, improved internal controls, and enhanced security measures.

Overall, this further aspect offers a comprehensive solution to the problem of in-person bank fraud. By combining advanced data analysis with real-time conversational monitoring, the system provides a multi-layered approach to fraud detection and prevention. The integration of AI/ML engines and speech recognition algorithms ensures thorough analysis of both application data and customer behavior, providing a robust defense against fraud.

The system's adaptability, scalability, and ease of integration make it a valuable tool for enhancing the security and reliability of banking operations. By continuously learning from new data and evolving threat patterns, the system remains effective in the face of emerging scams. Proactive notification and alert mechanisms further enhance the system's ability to prevent fraud before it can cause significant harm, providing a comprehensive and sophisticated solution to both remote and in-person fraud scenarios.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

Terms such as "computers," "machines," and similar phrases are used interchangeably based on the context to denote devices that may be general-purpose or specialized for specific functions, whether virtual or physical, and capable of network connectivity. This encompasses all pertinent hardware, software, and components known to those skilled in the field. Such devices might feature specialized circuits like application-specific integrated circuits (ASICs), microprocessors, cores, or other processing units for executing, accessing, controlling, or implementing various types of software, instructions, data, modules, processes, or routines. The employment of these terms within this document is not intended to restrict or exclusively refer to any specific type of electronic devices or components, and should be interpreted broadly by those with relevant expertise. For conciseness and assuming familiarity, detailed descriptions of computer/software components and machines are omitted.

Software, executable code, data, modules, procedures, and similar entities may reside on tangible, physical computer-readable storage devices. This includes a range from local memory to network-attached storage, and various other accessible memory types, whether removable, remote, cloud-based, or accessible through other means. These elements can be stored in both volatile and non-volatile memory forms and may operate under different conditions such as autonomously, on-demand, as per a preset schedule, spontaneously, proactively, or in response to certain triggers.

They may be consolidated or distributed across multiple computers or devices, integrating their memory and other components. These elements can also be located or dispersed across network-accessible storage systems, within distributed databases, big data infrastructures, blockchains, or distributed ledger technologies, whether collectively or in distributed configurations.

The term "networks" and similar references encompass a wide array of communication systems, including local area networks (LANs), wide area networks (WANs), the Internet, cloud-based networks, and both wired and wireless configurations. This category also covers specialized networks such as digital subscriber line (DSL) networks, frame relay networks, asynchronous transfer mode (ATM) networks, and virtual private networks (VPN), which may be interconnected in various configurations. Networks are equipped with specific interfaces to facilitate diverse types of communications—internal, external, and administrative—and have the ability to assign virtual IP addresses (VIPs) as needed. Network architecture involves a suite of hardware and software components, including but not limited to access points, network adapters, buses, both wired and wireless ethernet adapters, firewalls, hubs, modems, routers, and switches, which may be situated within the network, on its edge, or externally. Software and executable instructions operate on these components to facilitate network functions. Moreover, networks support HTTPS and numerous other communication protocols, enabling them to handle packet-based data transmission and communications effectively.

As used herein, Generative Artificial Intelligence (AI) or the like refers to AI techniques that learn from a representation of training data and use it to generate new content similar to or inspired by existing data. Generated content may include human-like outputs such as natural language text, source code, images/videos, and audio samples. Generative AI solutions typically leverage open-source or vendor sourced (proprietary) models, and can be provisioned in many ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used under various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in biology and medicine. (5) NVIDIA AI Models—Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in generative AI. One or more of the foregoing may be used herein as desired. All are considered within the sphere and scope of this disclosure.

Generative AI and LLMs can be used in various parts of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and using large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

FIG. 1 provides a detailed and comprehensive technical process flow designed to detect and prevent vishing attacks, showcasing how various advanced technologies are integrated to secure voice communications. Each step in this process is meticulously outlined to demonstrate the robustness of the system in ensuring the authenticity and security of calls.

The process begins with Call Initiation and SIP Invite (100), where the system first handles the initiation of a call by either a legitimate user or a scammer. The originating service provider sends a Session Initiation Protocol (SIP) invite, which is crucial for setting up the call. The SIP invite acts as the initial handshake, containing the necessary details to start the communication process.

Following the initiation, the process moves to Authentication Service at Originating Caller Service (102). In this step, the originating telephone service provider includes detailed authentication information in the SIP header. This information verifies the caller's identity and ensures the integrity of the communication. The authentication details can involve multiple levels of verification, such as partial, full, or gateway authentication, tailored to the caller and the call type. These details are prepared meticulously to ensure they provide a robust basis for the subsequent verification process.

The next step involves Data Transmission Using STIR/ SHAKEN Framework (104). The STIR (Secure Telephone Identity Revisited) and SHAKEN (Signature-based Handling of Asserted Information Using toKENs) frameworks are employed to transmit the call data securely. These frameworks utilize digital certificates based on public key cryptography to verify the calling number's authenticity. The service provider obtains these certificates from a trusted certificate authority, which ensures that the calling number has not been spoofed. This process maintains the security of the call and provides confidence to the recipient in the displayed caller ID. The digital certificates assist in preventing caller ID spoofing, which is a common tactic used in vishing attacks.

Once the data is transmitted, the system proceeds to Verification at Destination Service Provider (106). Here, the destination service provider receives the SIP data and verifies the transmitted information. The verification service examines the SIP Identity header, which includes a JSON web token (JWT) comprising the header, payload, and signature sections. The JWT is base64 URL encoded, ensuring secure transmission of authentication details. During verification, the payload is decoded to extract attestation details, origin and destination identifiers, and timestamps. This thorough verification process confirms the calling number's validity, allowing the call to proceed if deemed legitimate.

The SIP data is then sent to a Third-Party Database (108) for storage and further analysis. This third-party database, typically a cloud-based application integrated with the telephone service provider, acts as a repository for the detailed authentication and verification data. Storing this data enables subsequent steps in the detection and prevention process, particularly those involving advanced AI and ML analysis. The third-party database ensures that relevant data is readily available for real-time and post-call analysis, facilitating continuous improvement and adaptation of the system to emerging threats.

With verification complete, the system moves to Call Placement Based on Verification (110). If the verification confirms the caller ID details, the call is placed to the customer. This step marks the transition from initial verification to real-time analysis, where the AI/ML engine takes over to scrutinize the call data further.

The AI/ML Engine Analyzes SIP Data (112) is a critical component of the system. The AI/ML engine employs sophisticated machine learning algorithms to assess the SIP data for any anomalies that might indicate a potential scam. The engine considers various parameters, such as calls originating from blocked regions, abnormal call durations, and new calls from locations outside the usual pattern. This analysis is crucial for identifying suspicious activity early in the call process. The AI/ML engine is designed to be self-learning, meaning it continuously improves its detection capabilities based on new data and evolving threat patterns, ensuring the system remains effective against emerging vishing techniques.

If the AI/ML engine detects any anomalies suggesting that the caller might be a scammer, the process advances to Call Blocking if Potential Scam Detected (114). In this step, the call is blocked on the customer's device, and the customer is immediately notified of the attempted scam. This proactive approach helps prevent fraudulent interactions before they can cause any harm, effectively stopping the scammer in their tracks and protecting the customer from potential financial or personal information theft.

However, if the AI/ML engine is unable to conclusively determine the risk based on the SIP data alone, the call proceeds to the next level of scrutiny, Proceeding with Call if AI/ML is Indecisive (116). Here, the call is allowed to continue, but it undergoes further examination using the Viterbi algorithm for real-time analysis.

Real-Time Speech Analysis Using Viterbi Algorithm (118) is an advanced step where the Viterbi algorithm converts the spoken language into text for detailed examination of the conversation. By determining the most probable sequence of states given the sequence of observed acoustic features, the Viterbi algorithm accurately transcribes and analyzes the speech. It integrates various models, including acoustic models, language models, and pronunciation models, to ensure precise and comprehensive analysis. This real-time conversion and analysis are essential for detecting any suspicious patterns in the conversation that might not be evident from the SIP data alone.

Once the speech is converted to text, the process moves to Anomaly Pattern Detection (120). The converted text, along with the SIP data, is processed by an anomaly pattern detector. This detector represents another layer of the AI system designed to identify patterns indicative of vishing attacks. It scrutinizes the data for sudden spikes in call volume, typical vishing patterns, differences in voice signal ranges, and requests for sensitive information. The anomaly pattern detector's ability to flag these indicators helps in identifying and confirming vishing attempts with high accuracy.

If the anomaly pattern detector identifies a match with known vishing patterns, the system progresses to Identifying Vishing Patterns (122), where the presence of a vishing attack is confirmed. This leads to the final step, Call Termination and Customer Notification (124). In this step, the call is terminated immediately, stopping the communication between the scammer and the customer. The customer is informed of the potential fraud attempt, ensuring they are aware of the threat and can take any necessary actions to protect themselves further.

Overall, FIG. 1 illustrates a comprehensive, multi-layered approach to securing voice communications and protecting customers from vishing attacks. By integrating detailed SIP header customization, the robust STIR/SHAKEN framework, third-party databases for data storage, sophisticated AI/ML engines for anomaly detection, the Viterbi algorithm for real-time speech analysis, and anomaly pattern detectors, the system provides a powerful defense against fraudulent calls. This thorough and proactive approach ensures that every aspect of the call, from initiation to termination, is scrutinized and verified, significantly enhancing the security and reliability of voice communications. The integration of these technologies into a cohesive system not only protects customers from vishing attacks but also instills confidence in the overall security of their voice communications.

FIG. 2 provides a sample system diagram that outlines the intricate interactions and processes involved in detecting and preventing vishing attacks. This figure meticulously details how different entities and technologies collaborate to ensure call security and authenticity, integrating multiple layers of verification, real-time analysis, and machine learning to protect against fraudulent activities.

The process initiates with the Scammer Initiates a Call and SIP (Session Initiation Protocol) Invite is Initiated by Originating Service Provider to Place Call (200). Here, the scammer, acting as the calling party, initiates a call. The originating service provider sends a SIP invite, which is a crucial step for setting up the call. This invite includes the necessary details to start the communication process and sets the foundation for subsequent authentication and verification steps. In other words, the scammer initiates a call, and a SIP (Session Initiation Protocol) invite is sent by the originating service provider to place the call.

At Authentication Service Details Provided at Originating Caller Service (202), multiple detailed authentication steps for the initiated user are prepared in the SIP header. These authentication details are critical for verifying the caller's identity and ensuring the integrity of the communication. The originating telephone service provider utilizes this authentication service to create a SIP Identity header, which includes information such as the caller's identity and other relevant authentication data. This header ensures that the call setup carries enough data to validate the caller's legitimacy in the next stages of verification. Thus, multiple detailed authentication steps for the initiating user will be included in the SIP header, and this data will be sent for authorization. The originating telephone service provider uses the authentication service to create a SIP Identity header.

The next stage involves the Terminating Telephone Service Provider (204). Here, the originating service provider attempts to place the call to the destination using the SIP data. The data transmission occurs via the STIR/SHAKEN framework. STIR (Secure Telephone Identity Revisited) and SHAKEN (Signature-based Handling of Asserted Information Using toKENs) are frameworks that employ digital certificates based on public key cryptography techniques to verify the calling number's authenticity. The originating service provider obtains these digital certificates from a trusted certificate authority, ensuring the calling number has not been spoofed. This step is vital for maintaining the call's security and providing confidence to the recipient regarding the displayed caller ID. The digital certificates play a crucial role in preventing caller ID spoofing, a common tactic in vishing attacks. Additionally, the provider hosts Rich Call Data (RCD) content and embeds it in the SHAKEN tokens, which enhances the call's authenticity by including more detailed caller information.

Stated differently, in 204, the originating service provider attempts to place the call to the destination using SIP data, with data transmission occurring via the STIR/SHAKEN framework. STIR/SHAKEN uses digital certificates based on common public key cryptography techniques to ensure the security of the calling number. The service provider obtains these digital certificates from a certificate authority trusted by other telephone service providers. This certificate technology allows the called party to verify the accuracy of the calling number. The provider hosts Rich Call Data (RCD) content and embeds it in the SHAKEN tokens.

The Verification Service (206) then steps in to verify the transmitted data. The verification service at the destination service provider checks the SIP Identity header, which contains a JSON web token (JWT) with the header, payload, and signature sections. The JWT is base64 URL encoded to ensure secure transmission. The verification process involves decoding the payload to extract attestation details, origin and destination identifiers, and timestamps. Successful verification confirms the calling number's validity, allowing the call to proceed further in the process.

The verified data is cross-referenced with information from the Certificate Repository (208) and the CNAM Database (210). The certificate repository stores the digital certificates required for verifying the SIP Identity header's signature, ensuring the authenticity of the caller's information. The CNAM (Caller Name) database provides additional caller ID information, helping to identify the caller more accurately. This combined verification ensures a robust check against potential spoofing or fraudulent activities, significantly enhancing the security and reliability of the call setup.

For reference, the CNAM (Caller Name) database is a system used by telecommunication service providers to store and retrieve the caller ID information associated with a phone number. When a call is made, the CNAM database provides additional information about the caller, such as their name and, in some cases, their location. This information is displayed on the recipient's caller ID, helping to identify who is calling.

When a call is placed, the originating service provider sends the phone number to the terminating service provider. The terminating service provider then queries the CNAM database to retrieve the corresponding caller information. The CNAM database cross-references the phone number with its stored records and returns the caller's name and other relevant details. This process enhances the accuracy and reliability of caller ID information, aiding in the detection and prevention of fraudulent or spoofed calls.

The CNAM database is an essential component in maintaining trust in telecommunication systems, as it allows recipients to see not just the number but also the name of the caller, providing additional context that can help in verifying the legitimacy of the call. This is particularly useful in preventing vishing (voice phishing) attacks, where attackers often use spoofed numbers to trick victims. By providing accurate caller information, the CNAM database helps recipients make informed decisions about whether to answer a call or consider it suspicious.

If the verification identifies any issues, the call is directed to the Rejected/Terminated Calls (212) pool. Calls are rejected or terminated if they originate from blocked regions, exhibit abnormal call durations, fail to authenticate the caller identity, or come from new locations outside the caller's regular pattern. This step ensures that suspicious calls are stopped early in the process, preventing potential scams and safeguarding the recipient from fraudulent activities.

Upon successful verification, the call proceeds to Call Placed to Customer Based on Decision by Verification Service at Destination Service Provider with the Caller ID Details Identified and Attested (214). At this point, the AI/ML engine begins its analysis, assessing data from the CNAM database based on learning patterns to identify any anomalies with the originator and the available SIP header data.

In the Data from CNAM Database Assessed by AI/ML Engine Based On Learning Patterns (216) step, the AI/ML engine scrutinizes the data for any signs of fraudulent activity. The engine employs sophisticated machine learning algorithms to consider various parameters such as calls from blocked regions, abnormal call durations, and new calls from unusual locations. This analysis is crucial for identifying suspicious activity early in the call process. The AI/ML engine's self-learning capabilities enable it to continually improve its detection accuracy based on new data and evolving threat patterns, ensuring the system remains effective against emerging vishing techniques.

In other words, Data from the CNAM database is assessed by the AI/ML engine, which uses sophisticated learning patterns and algorithms to identify any anomalies associated with the originator. This assessment is performed by analyzing the caller information retrieved from the CNAM database and comparing it with historical data and known patterns of legitimate and fraudulent calls. The AI/ML engine examines various parameters, including the caller's name, location, and calling behavior, to detect any inconsistencies or suspicious activities.

Additionally, the AI/ML engine analyzes the available SIP header data, which includes detailed authentication information such as the caller identity, caller location, call initiation timestamp, and the digital certificates used for verification. By combining the CNAM data with the SIP header data, the AI/ML engine can perform a comprehensive analysis to determine the legitimacy of the call.

This dual assessment approach allows the AI/ML engine to identify potential anomalies more accurately, such as discrepancies in caller information, unusual call patterns, or attempts to spoof the caller ID. By leveraging both the CNAM data and the SIP header data, the system enhances its ability to detect and prevent vishing attacks, thereby providing a more robust and reliable defense against fraudulent calls.

If the AI/ML engine identifies the call initiator as a potential scammer, the process moves to Call Initiator is Potential Scammer? (218). If the answer is yes, the call is Rejected/Terminated (220). In this step, the call is blocked on the customer's device, and the customer is notified of the failed attack. This proactive approach prevents fraudulent interactions before they can cause harm, effectively stopping the scammer and protecting the customer from potential financial or personal information theft.

If the AI/ML engine cannot definitively identify the call as fraudulent or the call is initially flagged as not fraudulent, the call proceeds to Call Will Be Placed (222). Once the call is placed, it undergoes further examination using the Viterbi algorithm for real-time analysis of the communication. This examination can be an on-going analysis during the entirety of the call if desired or only an initial analysis if preferred.

The Viterbi Algorithm (224) is a sophisticated tool used for real-time speech analysis. This algorithm converts the input speech into text, allowing for detailed examination. It involves model combination, including acoustic models, language models, and pronunciation models. The speech Hidden Markov Model (HMM) uses states and observations to determine the most probable sequence of states based on the input speech. The process includes initialization, recursion, termination, and backtracking to ensure accurate transcription and analysis. The text output involves phoneme-to-word mapping, language model application, and final text output, providing a comprehensive analysis of the spoken content.

More specifically, the Viterbi algorithm is a dynamic programming algorithm used for decoding the most likely sequence of states, often applied in the context of hidden Markov models (HMMs). In speech recognition, it is particularly useful for converting spoken language into text by finding the most probable sequence of words given a sequence of observed sounds.

The Viterbi algorithm can be applied to speech recognition as follows. First, speech is provided as an input to the algorithm or engine executing the same. The input speech refers to the raw audio signal captured by a microphone.

This signal is typically a continuous wave of sound that varies in amplitude and frequency over time.

Next is model combination integration or selection. In speech recognition, model combination refers to the integration of various models to improve accuracy. These models include acoustic models, language models, and pronunciation models. Acoustic models represent the relationship between the audio signal and the phonetic units of speech. Language models provide the probabilities of sequences of words. Pronunciation models map words to their phonetic representations.

Speech HMM (Hidden Markov Model) refers to a hidden Markov model is a statistical model used to represent the probability distributions over sequences of observations. In speech recognition, an HMM represents the sequence of phonemes or words and their transitions. States correspond to the phonetic units or sub-units (such as phonemes or their parts). Observations represent the acoustic signal features derived from the input speech.

State decomposition involves breaking down the speech signal into smaller, more manageable units. Each state in the HMM corresponds to a specific phoneme or part of a phoneme. The speech signal is decomposed into frames, typically 10-20 milliseconds long, and each frame is analyzed to extract features like Mel-Frequency Cepstral Coefficients (MFCCs).

Speech states refer to the individual states within the HMM that correspond to specific phonetic units. Each state has a probability distribution over the possible observations (acoustic features). Transitions between states are also probabilistic and model the temporal structure of speech.

The Viterbi algorithm can be applied to find the most probable sequence of states (phonemes) given the observed sequence of acoustic features (input speech). A sample implementation can be considered as follows:

a. Initialization: Set up a matrix where rows represent states and columns represent time steps (frames of the speech signal). Initialize the starting probabilities.

b. Recursion: For each time step, compute the most probable state transition by considering the probabilities of previous states and the observation likelihood.

c. Termination: Identify the state sequence with the highest probability at the final time step.

d. Backtracking: Trace back through the matrix to determine the most likely sequence of states.

Text Output:

a. The final output of the Viterbi algorithm is the most likely sequence of states, which corresponds to a sequence of phonemes or words. This sequence is then mapped to text using the pronunciation model and language model.

b. Phoneme to Word Mapping: Convert the sequence of phonemes into words based on the pronunciation model.

c. Language Model Application: Use the language model to ensure the sequence of words makes sense contextually and syntactically.

d. Final Text Output: Produce the recognized text that corresponds to the input speech.

An example workflow using this algorithm is as follows:

a. Input Speech: An audio signal of someone saying "Hello, how are you?" is captured.

b. Feature Extraction: The audio signal is decomposed into frames, and features like MFCCs are extracted.

c. HMM Initialization: An HMM is set up with states representing phonemes.

d. Viterbi Initialization: A matrix is initialized with the starting probabilities.

e. Viterbi Recursion: For each frame, the most likely state transitions are computed.

f. Backtracking: The most likely sequence of states (phonemes) is determined.

g. Phoneme to Text Conversion: The sequence of phonemes is converted into words using the pronunciation model.

h. Language Model Application: The sequence of words is refined using the language model.

i. Final Text Output: The recognized text "Hello, how are you?" is produced.

In summary, the Viterbi algorithm is crucial for decoding the sequence of phonemes from the input speech, leveraging HMMs, state decomposition, and model combination to ultimately convert spoken language into text.

Once the speech is converted to text, it moves to the Anomaly Pattern Detector (226). This engine processes the converted text along with the SIP data, analyzing for possible scamming patterns. The detector looks for sudden spikes in call volume, basic vishing patterns, differences in voice signal ranges, and flags requests for sensitive data. It also detects urgency in obtaining information, which is a common trait in vishing attacks. This multi-layered analysis ensures that even subtle indicators of fraudulent activity are identified and acted upon.

More specifically, the anomaly pattern detector processes the converted text along with the combined SIP data. This involves a thorough analysis where the engine examines the converted text for any signs of suspicious activity. The engine looks for possible scamming patterns by identifying sudden spikes in call volume, which may indicate a mass vishing attack. It analyzes basic vishing patterns, such as repetitive or scripted language that is commonly used in fraudulent calls.

Additionally, the engine determines differences in voice signal range, which can help identify if the voice characteristics of the caller deviate from the norm. This includes detecting any inconsistencies in the caller's speech that may suggest the use of voice-altering technologies. The detector also flags any requests for sensitive data, such as personal identification numbers or passwords, which are common in vishing attempts.

Furthermore, the anomaly pattern detector identifies the urgency to obtain information, which is a typical tactic used by scammers to pressure victims into providing confidential information quickly. By combining these various indicators, the engine can effectively flag suspicious calls, providing an additional layer of security to prevent vishing attacks.

If the anomaly pattern detector identifies a scam match at Anomaly Pattern Detector Identifies Scam Match? (228), the call can be terminated immediately, and the customer is notified. This step ensures that any detected fraudulent activity results in swift action to protect the customer. If no fraudulent patterns or unknown patterns are detected, the call can be allowed to continue (230), with continuous monitoring and processing in real-time to ensure ongoing security if desired. This ensures that legitimate calls are not unnecessarily disrupted, while maintaining vigilance against potential threats.

In summary, FIG. 2 details a comprehensive system that integrates various technologies to verify, analyze, and authenticate calls, ensuring robust protection against vishing attacks. It showcases the detailed interactions between the scammer, service providers, verification services, AI/ML systems, and pattern detection engines, illustrating a multi-layered approach to securing voice communications. By employing a combination of SIP header customization, digital certificates, AI/ML analysis, real-time speech transcription, and anomaly detection, the system effectively detects and mitigates fraudulent activities, protecting customers from potential scams and enhancing the overall security of voice communications. This thorough and proactive approach ensures that every aspect of the call, from initiation to termination, is scrutinized and verified, significantly enhancing the security and reliability of voice communications. The integration of these technologies into a cohesive system not only protects customers from vishing attacks but also instills confidence in the overall security of their voice communications, providing peace of mind and a robust defense against fraudulent activities.

Figure 3:
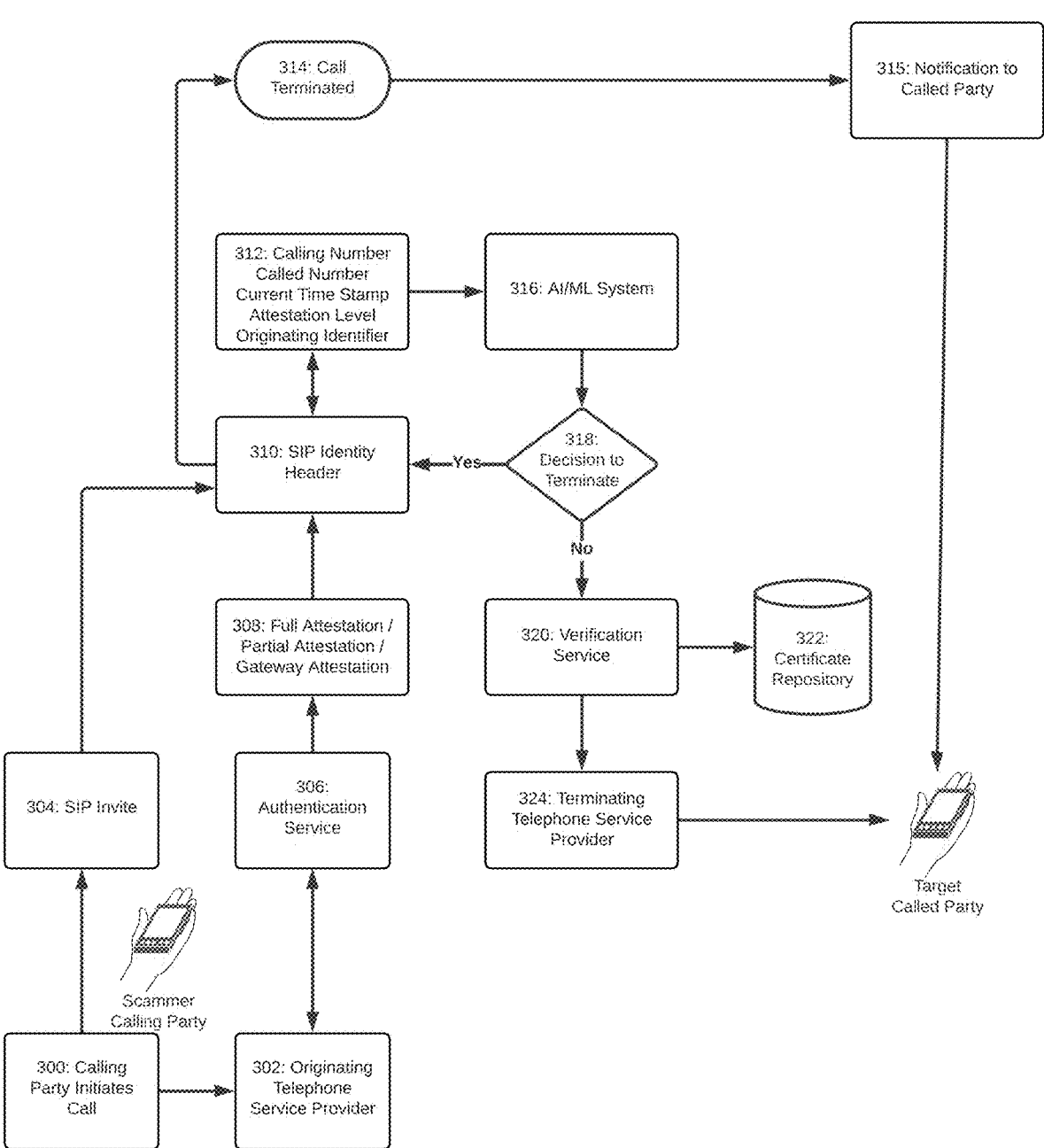
FIG. 3 is a sample, conceptual, flow diagram that outlines the step-by-step procedure for handling a call from initiation to termination, including the generation of the SIP invite, various levels of authentication, real-time analysis using the Viterbi algorithm, and final decision-making based on anomaly detection. It illustrates the continuous monitoring and verification processes that safeguard against vishing attacks.

FIG. 3 provides a comprehensive and detailed flow diagram that meticulously outlines the entire process of handling a call from its initiation to its termination, ensuring robust protection against vishing attacks. The diagram illustrates the various interactions between entities and technologies that work together to verify, authenticate, and analyze calls to prevent fraudulent activities.

The process begins with Calling Party Initiates Call (300). This initiation triggers the involvement of the originating telephone service provider (302), which takes over the responsibility of handling the call setup. The originating service provider sends a SIP (Session Initiation Protocol) Invite (304) to set up the call. This SIP invite is a crucial step as it contains the initial details required to establish the communication path between the calling and receiving parties, setting the foundation for subsequent verification and authentication steps.

Following the initiation of the SIP invite, Authentication Service (306) is utilized. The originating service provider uses this service to generate detailed authentication information that is embedded in the SIP header to verify the caller's identity. At this stage, the SIP header includes different levels of attestation—full, partial, or gateway—indicating the degree of verification performed on the caller's identity. Full Attestation/Partial Attestation/Gateway Attestation (308) ensures the call's integrity at varying levels of confidence. Full attestation signifies that the caller's identity has been thoroughly verified, partial attestation indicates a partial verification, and gateway attestation means the call is verified to the extent possible by the gateway.

SIP Identity Header (310) is then created, containing crucial information such as the calling number, called number, current timestamp, attestation level, and originating identifier. These elements are essential for the subsequent stages of verification. Calling Number, Called Number, Current Time Stamp, Attestation Level, Originating Identifier (312) ensure a robust initial check before the call proceeds further.

Once the SIP identity header is created, AI/ML (Artificial Intelligence/Machine Learning) System (316) steps in to analyze the SIP data. This system uses advanced algorithms to scrutinize the data for any anomalies that might indicate a potential scam. The AI/ML system considers various parameters, such as calls from blocked regions, abnormal call durations, and new calls from unusual locations. This analysis is crucial for identifying suspicious activity early in the call process. The AI/ML system's self-learning capabilities enable it to continually improve its detection accuracy based on new data and evolving threat patterns, ensuring the system remains effective against emerging vishing techniques.

If the AI/ML system identifies the call as potentially fraudulent, the call is terminated to prevent the scammer from proceeding and to protect the recipient from potential harm. The decision to terminate the call is based on the analysis performed by the AI/ML system. Call Terminated (314) is triggered if the system detects any suspicious activity, blocking the call on the customer's device and notifying the customer of the failed attack (315). This proactive approach helps prevent fraudulent interactions before they can cause harm, effectively stopping the scammer in their tracks and protecting the customer from potential financial or personal information theft.

If the AI/ML system cannot definitively identify the call as fraudulent, the call is allowed to proceed, leading to further scrutiny. Decision to Terminate (318) ensures only calls flagged by AI/ML are blocked. Verification Service (320) at the terminating service provider then takes over to perform additional verification checks. This service accesses the Certificate Repository (322) to verify the digital certificates included in the SIP identity header. These certificates ensure the call's origin and data integrity are legitimate, providing an additional layer of security. The certificate repository stores the digital certificates required for verifying the SIP identity header's signature, ensuring the authenticity of the caller's information.

Terminating Telephone Service Provider (324) receives the call and performs further verification checks based on the data provided by the originating service provider and the verification service. If the verification identifies any issues, the call is directed to the rejected/terminated calls pool. Calls are rejected or terminated if they originate from blocked regions, exhibit abnormal call durations, fail to authenticate the caller identity, or come from new locations outside the caller's regular pattern. This step ensures that suspicious calls are stopped early in the process, preventing potential scams and safeguarding the recipient from fraudulent activities.

Upon successful verification, the call proceeds, and the AI/ML engine continues to assess data from the CNAM (Caller Name) database based on learning patterns to identify any anomalies with the originator and the available SIP header data. The AI/ML engine scrutinizes the data for any signs of fraudulent activity, employing sophisticated machine learning algorithms to consider various parameters such as calls from blocked regions, abnormal call durations, and new calls from unusual locations. This analysis is critical for identifying suspicious activity early in the call process, leveraging the AI/ML engine's self-learning capabilities to continually improve its detection accuracy based on new data and evolving threat patterns.

If the AI/ML engine identifies the call initiator as a potential scammer, the call is terminated. The call is blocked on the customer's device, and the customer is notified of the failed attack. This proactive approach helps prevent fraudulent interactions before they can cause harm, effectively stopping the scammer and protecting the customer from potential financial or personal information theft.

If the AI/ML engine cannot definitively identify the call as fraudulent, the call proceeds. Once the call is placed, it undergoes further examination using the Viterbi Algorithm for real-time analysis of the communication. The Viterbi algorithm is a sophisticated tool used for real-time speech analysis. This algorithm converts the input speech into text, allowing for detailed examination. It involves model combination, including acoustic models, language models, and pronunciation models. The speech Hidden Markov Model (HMM) uses states and observations to determine the most probable sequence of states based on the input speech. The process includes initialization, recursion, termination, and backtracking to ensure accurate transcription and analysis. The text output involves phoneme-to-word mapping, language model application, and final text output, providing a comprehensive analysis of the spoken content.

Once the speech is converted to text, the Anomaly Pattern Detector processes the converted text along with the SIP data, analyzing for possible scamming patterns. The detector looks for sudden spikes in call volume, basic vishing patterns, differences in voice signal ranges, and flags requests for sensitive data. It also detects urgency in obtaining information, which is a common trait in vishing attacks. This multi-layered analysis ensures that even subtle indicators of fraudulent activity are identified and acted upon.

If the anomaly pattern detector identifies a scam match, the call is terminated immediately, and the customer is notified. This step ensures that any detected fraudulent activity results in swift action to protect the customer. If no or unknown patterns are detected, the Call Allowed to Continue, with continuous monitoring and processing to ensure ongoing security. This ensures that legitimate calls are not unnecessarily disrupted, while maintaining vigilance against potential threats.

In summary, FIG. 3 details a comprehensive system that integrates various technologies to verify, analyze, and authenticate calls, ensuring robust protection against vishing attacks. The diagram showcases the detailed interactions between the scammer, service providers, verification services, AI/ML systems, and pattern detection engines, illustrating a multi-layered approach to securing voice communications. By employing a combination of SIP header customization, digital certificates, AI/ML analysis, real-time speech transcription, and anomaly detection, the system effectively detects and mitigates fraudulent activities, protecting customers from potential scams and enhancing the overall security of voice communications. This thorough and proactive approach ensures that every aspect of the call, from initiation to termination, is scrutinized and verified, significantly enhancing the security and reliability of voice communications. The integration of these technologies into a cohesive system not only protects customers from vishing attacks but also instills confidence in the overall security of their voice communications, providing peace of mind and a robust defense against fraudulent activities. The detailed conceptual flow in FIG. 3 illustrates how each component of the system works together seamlessly to deliver a comprehensive and effective solution to the problem of vishing.

Figure 4:
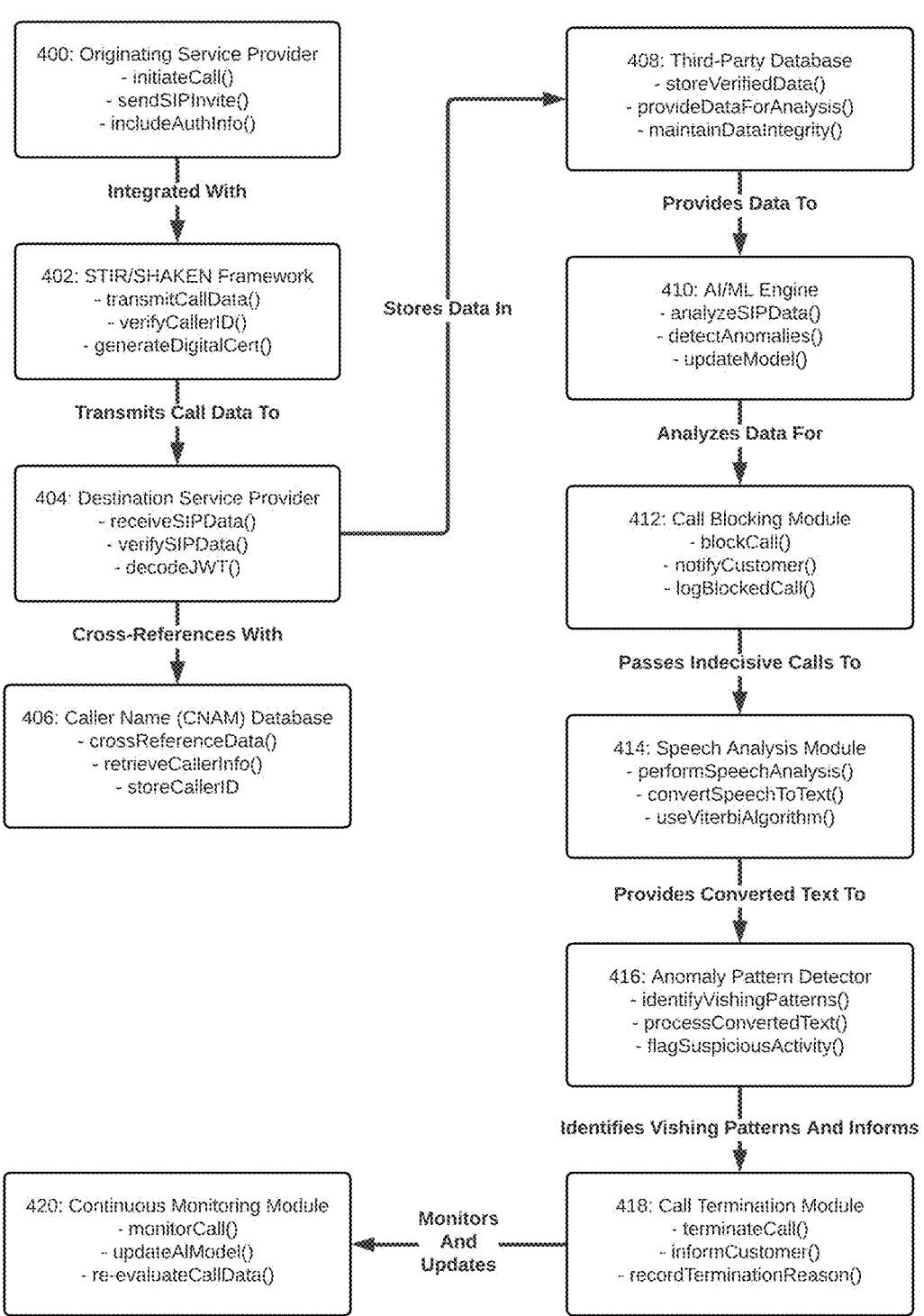
FIG. 4 is a sample class diagram that illustrates an information-security system for detecting and preventing vishing attacks, detailing its components, functions, and interactions. Each class represents a part of the system, such as service providers, databases, and analysis modules, highlighting their roles in verifying, analyzing, and responding to potential vishing threats.

FIG. 4 depicts a sample class diagram of an information-security system for detecting and preventing vishing attacks. The diagram illustrates the components of the system, their functions, and the relationships between them.

The Originating Service Provider (400) is responsible for initiating calls and sending Session Initiation Protocol (SIP) invites. It includes functions such as initiateCall( ) which initiates a call, sendSIPInvite( ) which sends the SIP invite, and includeAuthInfo( ) which includes detailed authentication information in the SIP header like caller identity, caller location, and call initiation timestamp.

The STIR/SHAKEN Framework (402) is integrated with the originating service provider and is configured to transmit the call data and employ digital certificates to verify the authenticity of the calling number. Its functions include transmitCallData( ) which transmits the call data, verify-CallerID( ) which verifies the calling number's authenticity using digital certificates, and generateDigitalCert( ) which generates the digital certificates to ensure the caller ID has not been spoofed.

The Destination Service Provider (404) receives the SIP data transmitted by the originating service provider and verifies it using a verification service. It includes receiveSIPData( ) which receives the SIP data, verifySIPData( ) which verifies the SIP data using a verification service, and decodeJWT( ) which decodes the SIP Identity header containing a JSON web token (JWT) with attestation details, origin and destination identifiers, and timestamps.

The Caller Name (CNAM) Database (406) cross-references the verified data and retrieves additional caller identification information. Its functions are crossReferenceData( ) which cross-references the verified data, retrieveCallerInfo( ) which retrieves additional caller identification information, and storeCallerID( ) which stores the caller ID information.

The Third-Party Database (408) is integrated with the destination service provider to store the verified SIP data and CNAM information for further analysis. Its functions include storeVerifiedData( ) which stores the verified SIP data and CNAM information, provideDataForAnalysis( ) which provides the stored data for further analysis, and maintainDataIntegrity( ) which ensures the integrity of the stored data.

The AI/ML Engine (410) analyzes the SIP data and CNAM information to detect anomalies by comparing them against known patterns of legitimate and fraudulent calls. Its functions are analyzeSIPData( ) which analyzes the SIP data and CNAM information, detectAnomalies( ) which detects anomalies such as calls from blocked regions, abnormal call durations, and new calls from unusual locations, and updateModel( ) which continuously learns from new data and evolves threat patterns to improve detection accuracy.

The Call Blocking Module (412) is integrated with the AI/ML engine to block calls and notify customers if potential fraud is detected. Its functions include blockCall( ) which blocks the call if potential fraud is detected, notifyCustomer( ) which notifies the customer of the blocked call, and logBlockedCall( ) which logs the details of the blocked call.

The Speech Analysis Module (414) performs real-time speech analysis if the AI/ML engine is indecisive and converts the spoken language into text using the Viterbi algorithm. Its functions are performSpeechAnalysis( ) which performs real-time speech analysis, convertSpeechToText( ) which converts the spoken language into text, and useViterbiAlgorithm( ) which applies the Viterbi algorithm to determine the most probable sequence of states given the observed acoustic features.

The Anomaly Pattern Detector (416) processes the converted text along with the SIP data and CNAM information to identify vishing patterns by analyzing both the linguistic content and the call metadata. Its functions include identifyVishingPatterns( ) which identifies vishing patterns such as sudden spikes in call volume, typical vishing patterns, differences in voice signal ranges, and requests for sensitive information, processConvertedText( ) which processes the converted text along with the SIP data, and flagSuspiciousActivity( ) which flags suspicious activities based on the analysis.

The Call Termination Module (418) terminates the call and informs the customer if a match with known vishing patterns is identified, preventing the continuation of the fraudulent call and alerting the customer to the attempted scam. Its functions are terminateCall( ) which terminates the call, informCustomer( ) which informs the customer about the termination and the detected threat, and recordTerminationReason( ) which records the reason for the call termination.

The Continuous Monitoring Module (420) continuously monitors the call for any suspicious patterns and periodically re-evaluates the call data to ensure ongoing security. Its functions include monitorCall( ) which continuously monitors the call, updateAIModel( ) which updates the AI/ML engine with new information to adapt to evolving vishing tactics, and re-evaluateCallData( ) which periodically re-evaluates the call data.

The relationships between these classes illustrate how the system components interact to detect and prevent vishing attacks. The Originating Service Provider (400) is integrated with the STIR/SHAKEN Framework (402), which transmits call data to the Destination Service Provider (404). The Destination Service Provider cross-references the data with the Caller Name (CNAM) Database (406) and stores the data in the Third-Party Database (408). The Third-Party Database provides data to the AI/ML Engine (410), which analyzes the data for anomalies and interacts with the Call Blocking Module (412). The Call Blocking Module passes indecisive calls to the Speech Analysis Module (414), which provides converted text to the Anomaly Pattern Detector (416). The Anomaly Pattern Detector identifies vishing patterns and informs the Call Termination Module (418), which monitors and updates the Continuous Monitoring Module (420). This detailed explanation of the class diagram provides an overview of the components, their functions, and the interactions within the information-security system designed to detect and prevent vishing attacks.

FIG. 5 illustrates a sample flow diagram of an information-security method for detecting and preventing vishing attacks. The process starts at step 500.

At step 502, a call is initiated, and a Session Initiation Protocol (SIP) invite is sent from an originating service provider. This SIP invite includes detailed authentication information in the SIP header, such as caller identity, caller location, and call initiation timestamp.

In step 504, the call data is transmitted using the STIR/SHAKEN framework. This framework employs digital certificates to verify the authenticity of the calling number, ensuring that the caller ID has not been spoofed. The STIR/SHAKEN framework uses public key cryptography to generate the digital certificates, providing a robust mechanism to prevent caller ID spoofing.

At step 506, the SIP data is received at a destination service provider and is verified using a verification service. This service decodes the SIP Identity header containing a JSON web token (JWT) with attestation details, origin and destination identifiers, and timestamps to confirm the validity of the calling number. The verification service utilizes a certificate repository to validate the digital certificates included in the SIP Identity header, comparing the certificates against trusted sources to ensure their validity.

Step 508 involves cross-referencing the verified data with a Caller Name (CNAM) database to retrieve additional caller identification information. This step helps in further authenticating the caller's identity by correlating it with known caller information.

In step 510, the verified SIP data and CNAM information are stored in a third-party database for further analysis. This step ensures that all authentication and verification details are available for subsequent processing. The third-party database is a cloud-based application integrated with the telephone service provider, which enables real-time and post-call analysis, ensuring continuous monitoring and rapid response to detected anomalies.

The next step, 512, involves analyzing the SIP data and CNAM information using an artificial intelligence and machine learning (AI/ML) engine. This engine detects anomalies by comparing the SIP data against known patterns of legitimate and fraudulent calls, identifying anomalies such as calls from blocked regions, abnormal call durations, and new calls from unusual locations. The AI/ML engine continuously learns from new data and evolving threat patterns to improve its accuracy in detecting anomalies, incorporating feedback from previously detected fraudulent calls to enhance its predictive capabilities.

If the AI/ML engine detects potential fraud based on the analysis of the SIP data and CNAM information, step 514 involves blocking the call and notifying the customer. This step prevents the fraudulent call from reaching the customer. The call blocking module logs the details of the blocked call for future reference.

If the AI/ML engine is indecisive, the call is allowed to proceed to step 516, where real-time speech analysis is performed using the Viterbi algorithm. This algorithm converts the spoken language into text by determining the most probable sequence of states given the sequence of observed acoustic features, including phonemes and words. The Viterbi algorithm integrates acoustic models, language models, and pronunciation models to accurately transcribe and analyze the speech in real-time, providing a detailed linguistic analysis that helps identify suspicious conversational patterns.

At step 518, the converted text, along with the SIP data and CNAM information, is processed using an anomaly pattern detector. This detector identifies vishing patterns by analyzing both the linguistic content and the call metadata, looking for indicators such as sudden spikes in call volume, typical vishing patterns, differences in voice signal ranges, and requests for sensitive information. The anomaly pattern detector uses machine learning techniques to recognize known vishing patterns based on the converted text and SIP data, identifying specific indicators of fraudulent activity such as urgent requests for personal information or inconsistencies in the caller's speech.

If the anomaly pattern detector identifies a match with known vishing patterns, the call is terminated, and the customer is informed at step 520, thereby preventing the continuation of the fraudulent call and alerting the customer to the attempted scam. The call termination module records the reason for the call termination and sends an alert message to the customer's device, including details of the detected threat and recommendations for further actions to protect their information.

If no suspicious patterns are detected, the method proceeds to step 522, where the call continues to be monitored and processed. This step ensures ongoing security by periodically re-evaluating the call data and updating the AI/ML engine with new information to adapt to evolving vishing tactics. The continuous monitoring module updates the AI/ML model with the latest threat intelligence and adapts to new scam tactics as they emerge, ensuring that the system remains effective against evolving threats.

The process concludes at step 524, where the overall monitoring and analysis are completed. This detailed explanation of FIG. 5 provides a comprehensive overview of the steps involved in the information-security method designed to detect and prevent vishing attacks, emphasizing the integration of various technologies and methods to ensure robust security measures.

Figure 6:
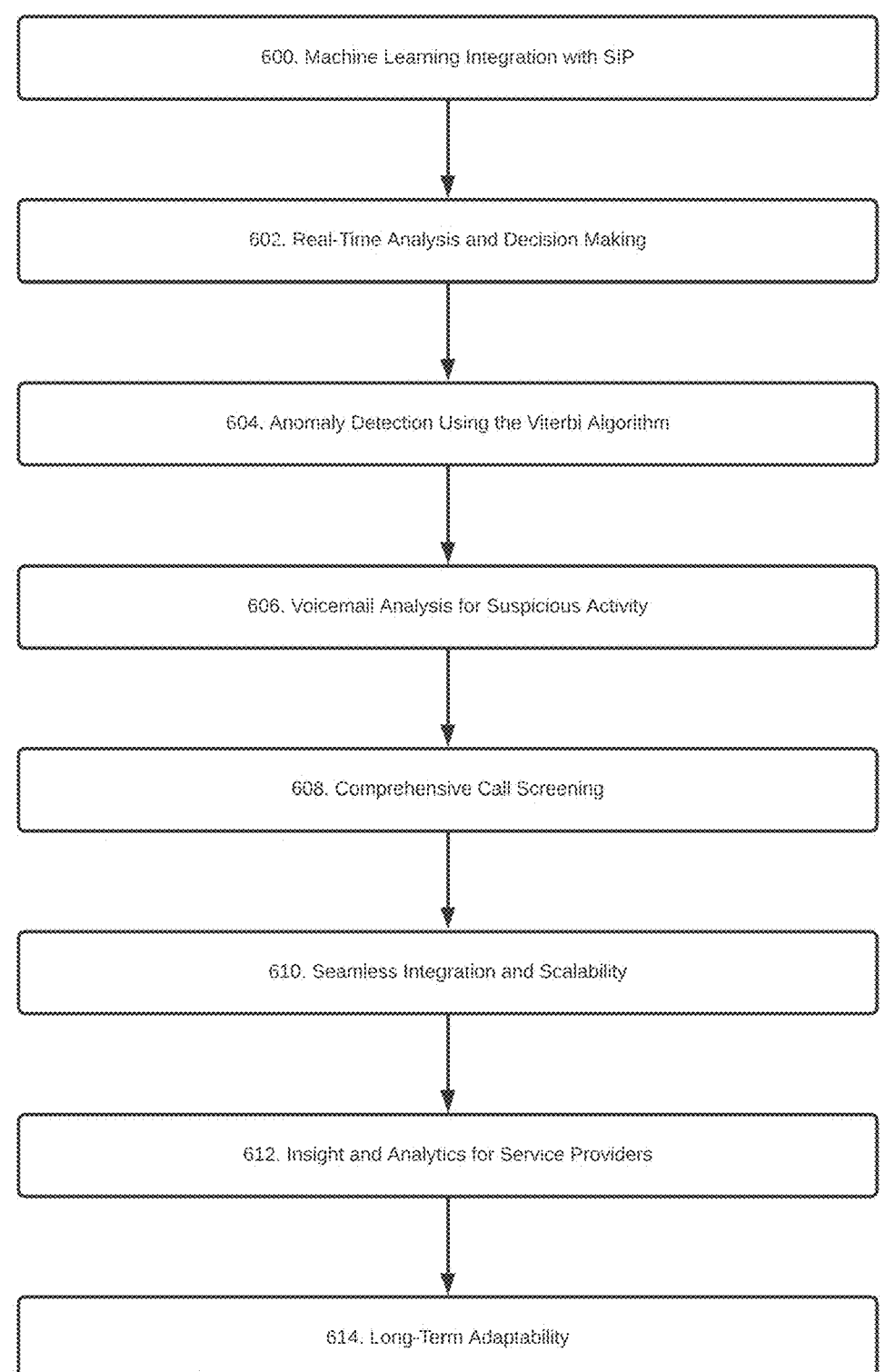
FIG. 6 is a flow chart that outlines the process where an incoming call undergoes initial SIP-based caller identification using a machine learning engine to analyze detailed authentication information, followed by real-time voicemail analysis employing the Viterbi algorithm to detect suspicious speech patterns and block potential fraudulent calls. This dual-phase approach ensures comprehensive monitoring and control of fraudulent activities during both pre-call and post-call phases.

FIG. 6 is a flow chart that outlines the process where an incoming call undergoes initial SIP-based caller identification using a machine learning engine to analyze detailed authentication information, followed by real-time voicemail analysis employing the Viterbi algorithm to detect suspicious speech patterns and block potential fraudulent calls. This dual-phase approach ensures comprehensive monitoring and control of fraudulent activities during both pre-call and post-call phases.

In Machine Learning Integration with SIP (600), the invention utilizes a machine learning engine that is integrated with the Session Initiation Protocol (SIP) to enhance caller identification before transitioning to a voice call. SIP is a signaling protocol widely used for initiating, maintaining, and terminating real-time sessions that include voice, video, and messaging applications. By integrating machine learning with SIP, the invention aims to pre-emptively identify and block unwanted calls at the initiation stage, thereby improving the overall security of the communication system.

When a call is initiated, the SIP invite, which is a request to establish a session, is augmented with detailed authentication information about the caller. This information includes caller ID, location, and the call initiation timestamp. The machine learning engine, which has been trained on a vast dataset comprising both legitimate and fraudulent calls, analyzes this data in real-time to assess the legitimacy of the caller. It identifies patterns that are indicative of potential scams, such as calls from unusual locations, spoofed caller IDs, or atypical calling behaviors.

In Real-Time Analysis and Decision Making (602), the process begins when the SIP invite is sent from the originating service provider. This invite includes detailed caller information, which is then processed by the machine learning engine in real-time. The engine compares the incoming data against known patterns of legitimate and fraudulent calls stored in its database. If the engine determines that the call is likely to be unwanted or spam, it blocks the call before it reaches the recipient. This real-time decision-making capability ensures that unwanted calls are intercepted at the earliest possible stage, significantly reducing the number of spam calls that customers receive and enhancing their overall security and experience.

In Anomaly Detection Using the Viterbi Algorithm (604), in instances where the SIP-based identification remains inconclusive, the invention employs a second layer of analysis using an anomaly detection engine. This engine leverages the Viterbi algorithm, a powerful tool for speech recognition and analysis. The Viterbi algorithm converts spoken language into text with high accuracy, analyzing speech patterns for characteristics such as tone, pitch, pauses, and specific keywords often associated with spam or fraudulent calls. This secondary analysis ensures that even if the initial SIP-based identification does not conclusively identify the call as fraudulent, there is an additional safeguard to detect suspicious behavior during the call.

In Voicemail Analysis for Suspicious Activity (606), the system examines the caller's speech patterns for several key indicators of suspicious activity. These include unusual speech patterns, inconsistencies in spoken information, and the use of high-pressure tactics or urgent language common in scam calls. For instance, if a caller is pressuring the recipient to provide personal information or make immediate decisions, the system flags these characteristics as suspicious. Additionally, the system compares the caller's speech against a database of known scam scripts and phrases, further enhancing its ability to detect potential fraud. If the system identifies suspicious characteristics during voicemail analysis, it automatically blocks any callback attempts from the recipient, thereby preventing further engagement with the potential scammer.

In Comprehensive Call Screening (608), the integration of SIP-based identification with real-time voicemail analysis provides a comprehensive approach to call screening. By addressing both the pre-call and post-call phases, the invention ensures that every possible avenue for fraudulent activity is monitored and controlled. The use of machine learning and advanced speech analysis techniques allows the system to continuously improve its detection capabilities, adapting to new scam tactics as they emerge. This dual-phase approach ensures robust protection against fraudulent activities throughout the entire call process.

In Seamless Integration and Scalability (610), the invention is designed to be integrated with existing telecommunications infrastructure without requiring significant changes. This makes it a cost-effective solution for service providers looking to enhance their security measures. The system's ability to operate in real-time ensures that customers are protected from scams as they happen, rather than relying on reactive measures that only address fraud after it has occurred. Additionally, the machine learning engine and anomaly detection algorithms can handle a large volume of calls simultaneously, making the system scalable for both individual users and large organizations. This scalability ensures consistent protection regardless of the number of calls being processed.

In Insight and Analytics for Service Providers (612), in addition to blocking unwanted calls and notifying customers, the system can provide valuable insights and analytics to service providers. By analyzing call patterns and identifying common characteristics of spam and fraud, the system helps providers understand and mitigate the risks associated with fraudulent calls. These insights can be used to develop new strategies and technologies for further enhancing call security. For example, service providers can use the data to improve their caller authentication processes, enhance their fraud detection algorithms, and educate customers about common scam tactics.

In Long-Term Adaptability (614), the combination of pre-call and post-call analysis ensures that every aspect of a call is scrutinized, providing customers with a high level of security and peace of mind. The system's adaptability, scalability, and ease of integration make it a valuable addition to any telecommunications infrastructure. By continuously monitoring and controlling every possible avenue for fraudulent activity, the invention ensures that the system remains effective in the face of evolving threats. The adaptive learning process of the machine learning engine allows it to continuously update its detection capabilities based on new data and emerging scam tactics, providing long-term protection for customers.

By leveraging the integration of machine learning with SIP-based identification and real-time speech analysis using the Viterbi algorithm, this additional aspect of the invention offers a robust and multi-layered approach to call screening and fraud prevention. The system not only enhances the initial screening process by analyzing detailed caller information but also adds a layer of protection by examining voicemail content. This comprehensive approach ensures that fraudulent activities are detected and mitigated at multiple stages, providing a high level of security for telecommunications users.

FIG. 7 is a sample pseudo diagram corresponding to the flow chart of FIG. 6 in accordance with one or more embodiments of the present invention. The provided pseudocode outlines a comprehensive process for handling incoming calls with a dual-phase approach designed to identify and block potential fraudulent calls using SIP-based caller identification and voicemail analysis with the Viterbi algorithm.

The function 'processIncomingCall(call)' begins at Step 700, where it extracts the SIP invite from the incoming call using the helper function 'getSIPInvite(call)'. At Step 702, the function retrieves detailed caller information from this SIP invite by calling 'extractCallerInfo(sipInvite)'. The retrieved caller information includes essential data such as the caller ID, location, and call initiation timestamp. At Step 704, this caller information is analyzed using a machine learning engine through the function 'analyzeCallerInfoML (callerInfo)', which returns a legitimacy score indicating the likelihood of the call being legitimate or fraudulent. This score is compared against a predefined threshold.

If the legitimacy score is below the threshold, indicating a high likelihood of the call being spam or fraudulent, the call is blocked at Step 706 using the 'blockCall (call)' function. At Step 708, the customer is notified of the blocked call with an appropriate message using 'notifyCustomer (call, "Blocked due to suspected spam")'. The process then ends by returning from the function at Step 710.

If the legitimacy score is above the threshold, suggesting the call might be legitimate, the call proceeds to the next phase of analysis. At Step 712, the function checks if the call goes to voicemail using 'callGoesToVoicemail(call)'. If the call goes to voicemail, the voicemail is recorded at Step 714 using 'recordVoicemail(call)'. The recorded speech is then converted to text at Step 716 using the Viterbi algorithm through the function 'convertSpeechToText(voicemail)'. This conversion enables detailed analysis of the speech patterns in the voicemail.

At Step 718, the converted text is analyzed for suspicious speech patterns using the 'analyzeSpeechViterbi(speechText)' function. The analysis looks for characteristics such as tone, pitch, pauses, and specific keywords often associated with spam or fraudulent calls. If suspicious patterns are detected, indicating potential fraud, the function moves to Step 720, where any callback attempts from the recipient are blocked using 'blockCallbackAttempts(call)'. At Step 722, the customer is notified that the voicemail has been flagged as suspicious using 'notifyCustomer(call, "Voicemail flagged as suspicious")'. If no suspicious patterns are found, the recipient is allowed to call back at Step 724 using 'allowCallback(call)'.

If the call does not go to voicemail, it is connected to the recipient after passing the initial SIP-based identification at Step 726 using 'connectCall (call)'. This step ensures that the call reaches the intended recipient only if it passes the legitimacy checks.

The helper functions are essential to this process. The 'getSIPInvite (call)' function at Step 728 extracts the SIP invite from the incoming call. At Step 730, 'extractCallerInfo(sipInvite)' retrieves detailed authentication from information the SIP invite. The 'analyzeCallerInfoML(callerInfo)' function at Step 732 uses the machine learning engine to analyze this caller information and returns a legitimacy score. At Step 734, 'blockCall (call)' blocks the call, preventing it from reaching the recipient. The 'notifyCustomer (call, message)' function at Step 736 informs the customer about the blocked call or suspicious voicemail.

The 'callGoesToVoicemail (call)' function at Step 738 determines if the call goes to voicemail. If so, 'recordVoicemail (call)' at Step 740 records the voicemail left by the caller. The 'convertSpeechToText(voicemail)' function at Step 742 uses the Viterbi algorithm to convert speech to text. At Step 744, 'analyzeSpeechViterbi(speechText)' analyzes the speech patterns for suspicious characteristics. If suspicious characteristics are detected, the 'blockCallbackAttempts (call)' function at Step 746 blocks any callback attempts from the recipient to the suspicious caller. If no suspicious patterns are detected, 'allowCallback (call)' at Step 748 allows the recipient to call back. Finally, the 'connectCall (call)' function at Step 750 connects the call to the recipient after passing initial checks.

This pseudocode ensures that all incoming calls are thoroughly analyzed for potential fraudulent activities using a combination of SIP-based caller identification and real-time speech pattern analysis. The dual-phase approach allows for the detection and blocking of fraudulent calls both at the initial call setup phase and during voicemail analysis, providing a robust and comprehensive solution for enhancing call security.

FIGS. 8-9 illustrate a sample pseudocode diagram that addresses in-person bank fraud through advanced data analysis and real-time threat conversational monitoring in accordance with one or more aspects of this disclosure.

At a high level, this aspect of the invention addresses the increasingly sophisticated issue of in-person bank fraud through a dual-phase approach that combines advanced data analysis with real-time conversational monitoring. This method enhances the ability of bank associates to detect and prevent fraudulent activities, ensuring a more secure banking environment.

The process initiates when a customer's application details, such as personal identification, account numbers, and transaction requests, are entered into the system. These details are scrutinized for any inconsistencies or unusual requests. Regardless of the initial suspicion level, all entered details are automatically fed into an AI/ML engine. This engine is rigorously trained on extensive datasets of legitimate and fraudulent transactions, enabling it to detect discrepancies and potential signs of fraud. It evaluates the data by comparing it against known patterns of fraud, such as mismatched information, abnormally large transactions, or requests that deviate significantly from the customer's typical banking behavior.

Simultaneously, the system incorporates a real-time conversation analysis engine equipped with sophisticated speech recognition algorithms. This engine operates on the associate's device, monitoring the ongoing conversation between the bank associate and the customer. The speech recognition algorithms convert the spoken dialogue into text, enabling the system to analyze the conversation for indicators of deceit. The engine is adept at identifying suspicious speech patterns, such as hesitations, inconsistencies in the narrative, or the use of high-pressure tactics. Additionally, it recognizes keywords and phrases that are commonly associated with fraudulent activities, such as urgent requests for immediate action or reluctance to provide certain information.

By merging the analytical outputs from both the application data and the conversational context, the system forms a comprehensive risk assessment. This dual-faceted approach ensures that both verbal and non-verbal cues are considered, offering a holistic view of the potential fraud scenario. If the AI/ML engine and the conversation analysis engine collectively indicate a high probability of fraud, the system triggers an alert. This alert is disseminated to the bank associate, security personnel, and other relevant staff within the bank. The alert includes detailed information outlining the reasons for suspicion, thereby empowering the staff to make informed decisions on how to proceed.

The real-time alert system significantly empowers bank associates to take immediate action to prevent fraudulent transactions. Upon receiving an alert, they can verify additional details with the customer, consult with security personnel, or even deny the transaction if necessary. This proactive approach mitigates the risk of fraud, protecting both the bank and the customer from potential financial losses. Moreover, the system is designed to be continually updated with new data and threat patterns, ensuring its effectiveness against emerging fraud techniques. The AI/ML engine is capable of learning from each interaction, progressively improving its accuracy and detection capabilities. This continuous learning process allows the system to adapt to new fraud tactics, providing long-term security for the bank and its customers.

In addition to real-time fraud detection, the invention includes features for post-transaction analysis. If a transaction is flagged as suspicious but allowed to proceed, the system monitors subsequent activities on the account for further signs of fraud. This includes tracking the movement of funds, observing for unusual withdrawals, and analyzing further interactions with the bank. If any additional suspicious activities are detected, the system alerts the bank's security team for further investigation.

The system also aids in identifying customers who may be vulnerable to manipulation or coercion by analyzing speech patterns and behaviors. This capability is particularly valuable for protecting vulnerable individuals, such as the elderly, from being exploited by fraudsters. By flagging situations where a customer appears to be under duress or influenced by a third party, the system provides an additional layer of protection.

The seamless integration of this system into the bank's existing infrastructure is designed to require minimal changes to operational processes, making it a cost-effective solution for enhancing security. The system can be deployed on standard hardware used by bank associates, leveraging cloud-based services for data analysis and storage. This approach ensures quick and easy implementation across multiple branches, enhancing the overall security framework without significant investment.

Scalability is another key advantage of this invention. The system is designed to handle a high volume of transactions and interactions simultaneously, making it suitable for both small branches and large financial institutions. This scalability ensures that all customers, regardless of the branch they visit, receive the same high level of protection against fraud.

Furthermore, the invention provides valuable insights and analytics to the bank's management team. By analyzing data on fraudulent transactions and suspicious activities, the system can identify trends and patterns that may indicate systemic vulnerabilities. These insights can be used to develop targeted training programs for staff, improve internal controls, and enhance overall security measures. This capability not only helps in mitigating current fraud risks but also in anticipating and preparing for future threats.

Overall, this aspect of the invention offers a comprehensive solution to the problem of in-person bank fraud. By combining advanced data analysis with real-time conversational monitoring, the system provides a multi-layered approach to fraud detection and prevention. The integration of AI/ML engines and speech recognition algorithms ensures that both the application data and the customer's behavior are thoroughly analyzed, providing a robust defense against fraud. The system's adaptability, scalability, and ease of integration make it a valuable tool for enhancing the security and reliability of banking operations. By continuously learning from new data and evolving threat patterns, the system remains adaptive and effective in the face of emerging scams. The proactive notification and alert mechanisms further enhance the system's ability to prevent fraud before it can cause significant harm.

Thus, the foregoing inventions provide a powerful and versatile solution to the challenges of modern telecommunications security. It not only addresses the specific threat of in-person bank fraud but also extends its capabilities to other forms of fraud, ensuring comprehensive protection for individuals and organizations alike. The detailed integration of advanced technologies ensures that every aspect of a call or transaction is thoroughly analyzed and verified, providing peace of mind and security in an increasingly digital world. The system's ability to adapt to new threats and continuously improve its detection capabilities makes it a critical tool in the fight against fraud.

More specifically, as illustrated in the detailed pseudocode in FIG. 8, the foregoing can be understood as follows.

The provided pseudocode outlines a comprehensive process for addressing in-person bank fraud using a dual-phase approach that combines advanced data analysis with real-time conversational monitoring. This method enhances the ability of bank associates to detect and prevent fraudulent activities, ensuring a more secure banking environment.

The process initiates at Step 800 when a customer's application details, such as personal identification, account numbers, and transaction requests, are entered into the system using the function 'enterApplicationDetails(customerApplication)'. These details are scrutinized for any inconsistencies or unusual requests. At Step 802, the entered details are automatically fed into an AI/ML engine through the function 'analyzeApplicationDataAI(customerApplication)'. This engine, trained on extensive datasets of legitimate and fraudulent transactions, evaluates the data for discrepancies and potential signs of fraud by comparing it against known fraud patterns, such as mismatched information, abnormally large transactions, or requests that deviate significantly from the customer's typical banking behavior.

At Step 804, the system checks for data inconsistencies. If inconsistencies are found, indicated by 'analysisResult.hasInconsistencies( )', the application is flagged as suspicious at Step 806 using 'flagAsSuspicious(customerApplication)'. Then, at Step 808, the suspicious details are subjected to an enhanced analysis using the AI/ML engine with the function 'analyzeSuspiciousDetailsAI(customerApplication)'. If no inconsistencies are found, the system proceeds to real-time conversation analysis at Step 810 using 'proceedToRealTimeConversationAnalysis(customerApplication)'.

In the real-time conversation analysis phase, initiated at Step 812 with 'startRealTimeConversationAnalysis(customerApplication)', the system monitors the conversation between the bank associate and the customer using speech recognition algorithms through the function 'monitorConversationWithSpeechRecognition( )', marked as Step 814. The monitored speech is converted to text at Step 816 using 'convertSpeechToText(monitorConversation)'. This text is then analyzed for suspicious speech patterns at Step 818 using the function 'analyzeSpeechPatterns(conversationText)'.

At Step 820, the system checks for suspicious speech patterns, indicated by 'speechAnalysisResult.hasSuspiciousPatterns( )'. If suspicious patterns are detected, the system triggers an alert at Step 822 using 'triggerAlert(customerApplication, speechAnalysisResult)'. This alert notifies the bank and associate personnel at Step 824 using 'notifyBankStaff(customerApplication, speechAnalysisResult)', and provides detailed reasons for suspicion at Step 826 using 'provide DetailedReasons(customerApplication, speechAnalysisResult)'. If no suspicious patterns are found, the transaction is allowed to proceed at Step 828 using 'allowTransaction(customerApplication)'.

Post-transaction monitoring begins at Step 830 with 'monitorPostTransaction(customerApplication)', where the system continues to monitor account activities for suspicious behavior. At Step 832, the system monitors account activities using 'monitorAccountActivities (customerApplication) '. If unusual withdrawals or interactions are detected at Step 834 using 'detectUnusualActivities (customerApplication)', the system alerts the security team at Step 836 using 'alertSecurityTeam(customerApplication)'.

The helper functions play a critical role in this process. At Step 800, 'enterApplicationDetails(customerApplication)' enters customer application details into the system. At Step 802, 'analyzeApplicationDataAI(customerApplication)' analyzes application data using the AI/ML engine and returns the analysis result. At Step 806, 'flagAsSuspicious (customerApplication)' flags the application as suspicious. At Step 808, 'analyzeSuspiciousDetailsAI (customerApplication)' performs enhanced analysis on suspicious details using the AI/ML engine and returns the enhanced analysis result. At Step 810, 'proceedToRealTimeConversationAnalysis (customerApplication)' moves the process to the real-time conversation analysis phase. At Step 812, 'startRealTimeConversationAnalysis (customerApplication)' starts real-time conversation analysis. At Step 814, 'monitorConversationWithSpeechRecognition( )' monitors the conversation using speech recognition algorithms. At Step 816, 'convertSpeechToText(monitorConversation)' converts the monitored speech to text. At Step 818, 'analyzeSpeechPatterns(conversationText)' analyzes speech patterns from the text and returns the speech analysis result. At Step 822, 'triggerAlert(customerApplication, speechAnalysisResult)' triggers an alert based on the analysis result. At Step 824, 'notifyBankStaff(customerApplication, speechAnalysisResult)' notifies the bank associate and security personnel. At Step 826, 'provideDetailedReasons(customerApplication, speechAnalysisResult)' provides detailed reasons for suspicion to bank staff. At Step 828, 'allowTransaction (customerApplication)' allows the transaction to proceed. At Step 830, 'monitorPostTransaction (customerApplication)' monitors the transaction post-completion. At Step 832, 'monitorAccountActivities (customerApplication)' monitors account activities for suspicious behavior. At Step 834, 'detectUnusualActivities (customerApplication)' detects unusual withdrawals or interactions. Finally, at Step 836, 'alertSecurityTeam (customerApplication)' alerts the bank's security team for further investigation.

This pseudocode ensures that in-person bank fraud is comprehensively addressed through a combination of advanced data analysis and real-time conversational monitoring, providing a robust defense against fraudulent activities.

Although the present technology has been described based on what is currently considered the most practical and preferred implementations, it is to be understood that this detail is only for that purpose and this disclosure is not limited to the sample descriptions and implementations but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An artificial intelligence (AI) method for phishing detection and call screening using web crawling, web scraping, machine learning, and real-time speech analysis, comprising the steps of:

deploying a web crawler to identify and retrieve web pages potentially associated with phishing activities by continuously scanning an internet for new or modified web pages that match predefined criteria indicative of phishing attempts;

using a web scraping agent to extract content from the retrieved web pages, including text, images, and metadata, to create a comprehensive dataset for analysis;

performing feature engineering on the extracted content to generate a set of features indicative of phishing characteristics, the phishing characteristics comprising suspicious Uniform Resource Locators (URLs), unusual domain names, and specific keywords commonly found in phishing attacks;

training a random forest algorithm on a dataset comprising known phishing and legitimate web pages to create a trained phishing detection model, utilizing supervised learning techniques to enhance model accuracy;

applying the trained phishing detection model to the set of features to classify the web pages as phishing or legitimate, providing a probabilistic score for each classification to indicate a confidence level of a prediction;

integrating the phishing detection model into a security infrastructure to provide real-time phishing detection and alerts, ensuring that potential threats are identified and addressed promptly;

updating the phishing detection model periodically with new data to improve accuracy and adapt to emerging phishing tactics, utilizing continuous integration and deployment practices to maintain model effectiveness;

generating a report on detected phishing activities, including details on the classified phishing web pages, the set of features used for classification, and confidence scores, to provide comprehensive insights into phishing threats;

implementing a feedback mechanism to refine the web crawler and web scraping agent based on the detected phishing activities and user inputs, allowing for iterative improvements in performance of a system;

ensuring compliance with relevant data protection regulations throughout a phishing detection process, including anonymizing sensitive data and adhering to privacy standards;

providing an interface for users to review and manage the detected phishing activities, offering tools for the users to report false positives or confirm detections to further refine the detection model;

deploying a machine learning engine integrated with a Session Initiation Protocol (SIP) to attempt caller identification before transitioning to a voice call, enhancing the initial screening process by leveraging detailed caller information;

augmenting SIP invite with detailed authentication information about a caller, including identity, location, and call initiation timestamp, to enable a thorough assessment of call legitimacy;

analyzing the SIP invite with the machine learning engine, comparing the SIP invite against known patterns of legitimate and fraudulent calls, using a model trained on a vast dataset to identify indicators of potential scams;

blocking the call at an initiation stage if the machine learning engine determines the call to be likely unwanted or spam, preventing the call from reaching a recipient and reducing unwanted calls received;

employing an anomaly detection engine using a Viterbi algorithm to analyze caller speech patterns during voicemail messages if analyzing the SIP invite remains inconclusive, leveraging advanced speech recognition and analysis techniques;

identifying suspicious characteristics in voicemail analysis, the suspicious characteristics comprising unusual speech patterns, inconsistencies, high-pressure tactics, or keywords associated with spam, by comparing voicemail content to known scam scripts and behavioral patterns;

automatically blocking any callback attempts from the recipient if the suspicious characteristics are detected during the voicemail analysis, preventing further engagement by potential scammers;

notifying a customer of a potential spam or unwanted call and providing detailed information about a detected threat, including a reason for a suspicion and any relevant patterns identified;

continuously improving detection capabilities of the system by adapting to new scam tactics through an adaptive learning process, ensuring the system remains effective against evolving threats;

integrating the system with existing telecommunications infrastructure to enhance security measures without requiring significant changes, ensuring compatibility and ease of deployment for service providers; and providing insights and analytics to service providers by analyzing call patterns and identifying common characteristics of spam and fraud to develop new strategies for enhancing call security, offering valuable data for proactive threat management.

2. The AI method of claim 1, wherein the web crawler is configured to use multiple search engines and social media platforms to identify a broader range of potentially malicious web pages.

3. The AI method of claim 2, wherein the web scraping agent includes natural language processing (NLP) capabilities to analyze textual content for context and sentiment, enhancing accuracy of feature extraction.

4. The AI method of claim 3, wherein the feature engineering incorporates user behavioral data comprising click patterns and browsing history to improve detection model ability to distinguish between phishing and legitimate web pages.

5. The AI method of claim 4, wherein the phishing detection model is periodically retrained using a federated learning approach, enabling integration of new data from multiple sources without compromising user privacy.

6. The AI method of claim 5, wherein the security infrastructure includes an automated response mechanism that can quarantine or block access to the classified phishing web pages in real-time.

7. The AI method of claim 6, wherein the interface provided for the users includes customizable alert settings, allowing the users to specify preferred notification methods and sensitivity levels for phishing detection.

8. The AI method of claim 7, wherein the machine learning engine integrated with a Session Initiation Protocol (SIP) utilizes a multi-layer perceptron (MLP) network to enhance accuracy of caller identification.

9. The AI method of claim 8, wherein the anomaly detection engine employing the Viterbi algorithm is supplemented with a secondary algorithm, Hidden Markov Models (HMM), to improve detection of complex speech patterns indicative of fraudulent activity.

10. The AI method of claim 9, wherein the system provides a detailed analytics dashboard for service providers, including metrics on call blocking rates, types of detected scams, and geographical distribution of fraud attempts, to aid in strategic decision-making and resource allocation.

11. An artificial intelligence (AI) system for phishing detection and call screening, comprising a storage device storing:

a web crawler configured to continuously scan an internet and retrieve web pages potentially associated with phishing activities by matching predefined criteria indicative of phishing attempts;

a web scraping agent operatively connected to the web crawler, configured to extract content from the retrieved web pages, including text, images, and metadata;

a feature engineering module configured to process the extracted content to generate a set of features indicative of phishing characteristics, the phishing characteristics comprising suspicious Uniform Resource Locators (URLs), unusual domain names, and specific keywords commonly found in phishing attacks;

a machine learning model comprising a random forest algorithm trained on a dataset of known phishing and legitimate web pages, configured to classify the web pages as phishing or legitimate based on the generated set of features;

a real-time detection engine operatively connected to the machine learning model, configured to apply the machine learning model to the set of features and provide real-time phishing detection and alerts;

a model update module configured to periodically update the machine learning model with new data to improve accuracy and adapt to emerging phishing tactics;

a reporting module configured to generate reports on detected phishing activities, including details on the classified phishing web pages, the set of features used for classification, and confidence scores;

a feedback mechanism integrated into the web crawler and web scraping agent, configured to refine their operations based on the detected phishing activities and user inputs;

a compliance module configured to ensure that the system adheres to relevant data protection regulations throughout a phishing detection process;

a user interface configured to allow users to review and manage the detected phishing activities, report false positives, and confirm detections;

a Session Initiation Protocol (SIP) module configured to process SIP invites with detailed authentication information about a caller, including identity, location, and call initiation timestamp;

a caller identification engine comprising a machine learning model trained on a dataset of legitimate and fraudulent calls, configured to analyze the SIP invites and determine legitimacy of the caller;

a call blocking module operatively connected to the caller identification engine, configured to block calls at an initiation stage if the calls determined to be likely unwanted or spam;

an anomaly detection engine employing a Viterbi algorithm, configured to analyze caller speech patterns during voicemail messages if analyzing the SIP invites remains inconclusive;

a voicemail analysis module configured to identify suspicious characteristics in voicemail analysis, the suspicious characteristics comprising unusual speech patterns, inconsistencies, high-pressure tactics, or keywords associated with spam;

a callback blocking module configured to automatically block any callback attempts from a recipient if the suspicious characteristics are detected during the voicemail analysis;

a notification module configured to notify a customer of a potential spam or unwanted call and provide detailed information about a detected threat;

an adaptive learning module configured to continuously improve detection capabilities of the system by adapting to new scam tactics;

an integration module configured to ensure compatibility with existing telecommunications infrastructure, enhancing security measures without requiring significant changes; and an analytics dashboard for service providers, configured to provide insights and analytics on call patterns, characteristics of spam and fraud, and metrics on call blocking rates.

12. The AI system of claim 11, wherein the web crawler is configured to use multiple search engines and social media platforms to identify a broader range of potentially malicious web pages.

13. The AI system of claim 12, wherein the web scraping agent includes natural language processing (NLP) capabilities to analyze textual content for context and sentiment, enhancing accuracy of feature extraction.

14. The AI system of claim 13, wherein the feature engineering module incorporates user behavioral data comprising click patterns and browsing history to improve detection model ability to distinguish between phishing and legitimate web pages.

15. The AI system of claim 14, wherein the machine learning model is periodically retrained using a federated learning approach, enabling integration of new data from multiple sources without compromising user privacy.

16. The AI system of claim 15, wherein the real-time detection engine includes an automated response mechanism that can quarantine or block access to the classified phishing web pages in real-time.

17. The AI system of claim 16, wherein the user interface includes customizable alert settings, allowing the users to specify preferred notification methods and sensitivity levels for phishing detection.

18. The AI system of claim 17, wherein the caller identification engine utilizes a multi-layer perceptron (MLP) network to enhance accuracy of caller identification.

19. The AI system of claim 18, wherein the anomaly detection engine employing the Viterbi algorithm is supplemented with a secondary algorithm, Hidden Markov Models (HMM), to improve detection of complex speech patterns indicative of fraudulent activity.

20. An artificial intelligence (AI) method for phishing detection and call screening using web crawling, web scraping, machine learning, and real-time speech analysis, comprising the steps of:

deploying a web crawler to identify and retrieve web pages potentially associated with phishing activities;

using a web scraping agent to extract content from the retrieved web pages;

performing feature engineering on the extracted content to generate a set of features indicative of phishing characteristics;

training a random forest algorithm on a dataset comprising known phishing and legitimate web pages to create a trained phishing detection model;

applying the trained phishing detection model to the set of features to classify the web pages as phishing or legitimate;

integrating the phishing detection model into a system's security infrastructure to provide real-time phishing detection and alerts;

updating the phishing detection model periodically with new data to improve accuracy and adapt to emerging phishing tactics;

generating a report on detected phishing activities, including details on the classified phishing web pages and the set of features used for classification;

implementing a feedback mechanism to refine the web crawler and web scraping agent based on the detected phishing activities and user inputs;

ensuring compliance with relevant data protection regulations throughout a phishing detection process;

providing an interface for users to review and manage the detected phishing activities;

deploying a machine learning engine integrated with a Session Initiation Protocol (SIP) to attempt caller identification before transitioning to a voice call;

augmenting SIP invite with detailed authentication information about a caller, including identity, location, and call initiation timestamp;

analyzing the SIP invite with the machine learning engine, comparing the SIP invite against known patterns of legitimate and fraudulent calls;

blocking the call before an initiation stage if the machine learning engine determines the call to be likely unwanted or spam;

employing an anomaly detection engine using a Viterbi algorithm to analyze caller speech patterns during voicemail messages if analyzing the SIP invite remains inconclusive;

identifying suspicious characteristics in voicemail analysis, the suspicious characteristics comprising unusual speech patterns, inconsistencies, high-pressure tactics, or keywords associated with spam;

automatically blocking any callback attempts from a recipient if the suspicious characteristics are detected during the voicemail analysis;

notifying a customer of a potential spam or unwanted call and providing detailed information about a detected threat;

continuously improving detection capabilities of the system by adapting to new scam tactics through an adaptive learning process;

integrating the system with existing telecommunications infrastructure to enhance security measures without requiring significant changes; and providing insights and analytics to service providers by analyzing call patterns and identifying common characteristics of spam and fraud to develop new strategies for enhancing call security.

\* \* \* \* \*